(12) United States Patent
Akao

(10) Patent No.: US 12,260,490 B2
(45) Date of Patent: Mar. 25, 2025

(54) THREE-DIMENSIONAL IMAGE PROCESSING APPARATUS, SYSTEM, AND METHOD THEREOF

(71) Applicant: SONY GROUP CORPORATION, Tokyo (JP)

(72) Inventor: Masato Akao, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 270 days.

(21) Appl. No.: 17/786,130

(22) PCT Filed: Dec. 1, 2020

(86) PCT No.: PCT/JP2020/044755
§ 371 (c)(1),
(2) Date: Jun. 16, 2022

(87) PCT Pub. No.: WO2021/131543
PCT Pub. Date: Jul. 1, 2021

(65) Prior Publication Data
US 2023/0014562 A1 Jan. 19, 2023

(30) Foreign Application Priority Data
Dec. 27, 2019 (JP) .................................. 2019-239640

(51) Int. Cl.
*G06T 15/20* (2011.01)
*G06F 3/14* (2006.01)
(Continued)

(52) U.S. Cl.
CPC ................ *G06T 15/20* (2013.01); *G06F 3/14* (2013.01); *G06T 7/20* (2013.01); *G06T 7/62* (2017.01); *G06T 7/70* (2017.01); *G06V 10/44* (2022.01); *G06V 10/56* (2022.01); *G06V 10/60* (2022.01); *G06V 10/761* (2022.01); *G09G 5/38* (2013.01);
(Continued)

(58) Field of Classification Search
None
See application file for complete search history.

(56) References Cited

U.S. PATENT DOCUMENTS 5,616,078 A 4/1997 Oh
2012/0105473 A1* 5/2012 Bar-Zeev ................. G06T 1/20
345/633

(Continued)

FOREIGN PATENT DOCUMENTS

CN 105917385 A 8/2016
EP 3098782 A1 11/2016
(Continued)

OTHER PUBLICATIONS

International Search Report and Written Opinion of PCT Application No. PCT/JP2020/044755, issued on Feb. 22, 2021, 12 pages of ISRWO.

*Primary Examiner* — Hilina K Demeter
(74) *Attorney, Agent, or Firm* — CHIP LAW GROUP

(57) ABSTRACT

An image processing apparatus includes an imaging unit that images a user and a real object, an analysis unit that analyzes an attitude of the real object based on imaging information captured by the imaging unit, and a control unit that controls display of an image related to the real object based on the attitude of the real object.

7 Claims, 35 Drawing Sheets

(51) Int. Cl.
*G06T 7/20* (2017.01)
*G06T 7/62* (2017.01)
*G06T 7/70* (2017.01)
*G06V 10/44* (2022.01)
*G06V 10/56* (2022.01)
*G06V 10/60* (2022.01)
*G06V 10/74* (2022.01)
*G09G 5/38* (2006.01)
*H04N 13/279* (2018.01)

(52) U.S. Cl.
CPC . *H04N 13/279* (2018.05); *G06T 2207/10024* (2013.01); *G06V 2201/07* (2022.01)

(56) References Cited

U.S. PATENT DOCUMENTS

| | | | |
|---|---|---|---|
| 2014/0292809 A1* | 10/2014 | Tsurumi | G06F 3/04812 345/633 |
| 2015/0371444 A1* | 12/2015 | Hara | G01B 11/14 345/633 |
| 2016/0332075 A1 | 11/2016 | Hirata et al. | |
| 2019/0005731 A1* | 1/2019 | Satake | G06F 3/011 |
| 2020/0074743 A1* | 3/2020 | Zheng | G01P 13/00 |
| 2020/0082600 A1* | 3/2020 | Jones | G06T 19/006 |
| 2021/0374390 A1* | 12/2021 | Dai | G06T 5/50 |
| 2022/0139051 A1* | 5/2022 | Jones | G06T 7/73 345/633 |

FOREIGN PATENT DOCUMENTS

| | | |
|---|---|---|
| JP | 07-185131 A | 7/1995 |
| JP | 09-054821 A | 2/1997 |
| JP | 2000-020193 A | 1/2000 |
| JP | 2000-224612 A | 8/2000 |
| JP | 2013-242835 A | 12/2013 |
| JP | 2015-136450 A | 7/2015 |
| JP | 2015210379 A | 11/2015 |
| JP | 2016-045815 A | 4/2016 |
| JP | 2017199404 A | 11/2017 |
| JP | 2018-044824 A | 3/2018 |
| WO | 2015/111261 A1 | 7/2015 |

* cited by examiner

F I G. 6

| FRAME NUMBER | POSITION | VIEWPOINT POSITION | SIZE | ATTITUDE | SHIELDED AREA | NON-SHIELDED AREA |
|---|---|---|---|---|---|---|
| 1001 | $(x_1, y_1, z_1)$ | $(xl_1, yl_1, zl_1), (xr_1, yr_1, zr_1)$ | $H_1, W_1$ | $\theta_1$ | $(X_{A1}, Y_{A1}), (X_{B1}, Y_{B1})$ | $(X_{C1}, Y_{C1}), (X_{D1}, Y_{D1})$ |
| 1002 | $(x_2, y_2, z_2)$ | $(xl_2, yl_2, zl_2), (xr_2, yr_2, zr_2)$ | $H_2, W_2$ | $\theta_2$ | $(X_{A2}, Y_{A2}), (X_{B2}, Y_{B2})$ | $(X_{C2}, Y_{C2}), (X_{D2}, Y_{D2})$ |
| 1003 | $(x_3, y_3, z_3)$ | $(xl_3, yl_3, zl_3), (xr_3, yr_3, zr_3)$ | $H_3, W_3$ | $\theta_3$ | $(X_{A3}, Y_{A3}), (X_{B3}, Y_{B3})$ | $(X_{C3}, Y_{C3}), (X_{D3}, Y_{D3})$ |
| ... | | | | | | |
| 1050 | $(x_{50}, y_{50}, z_{50})$ | $(xl_{50}, yl_{50}, zl_{50}), (xr_{50}, yr_{50}, zr_{50})$ | $H_{50}, W_{50}$ | $\theta_{50}$ | $(X_{A50}, Y_{A50}), (X_{B50}, Y_{B50})$ | $(X_{C50}, Y_{C50}), (X_{D50}, Y_{D50})$ |
| ... | | | | | | |

140b

FIG.15
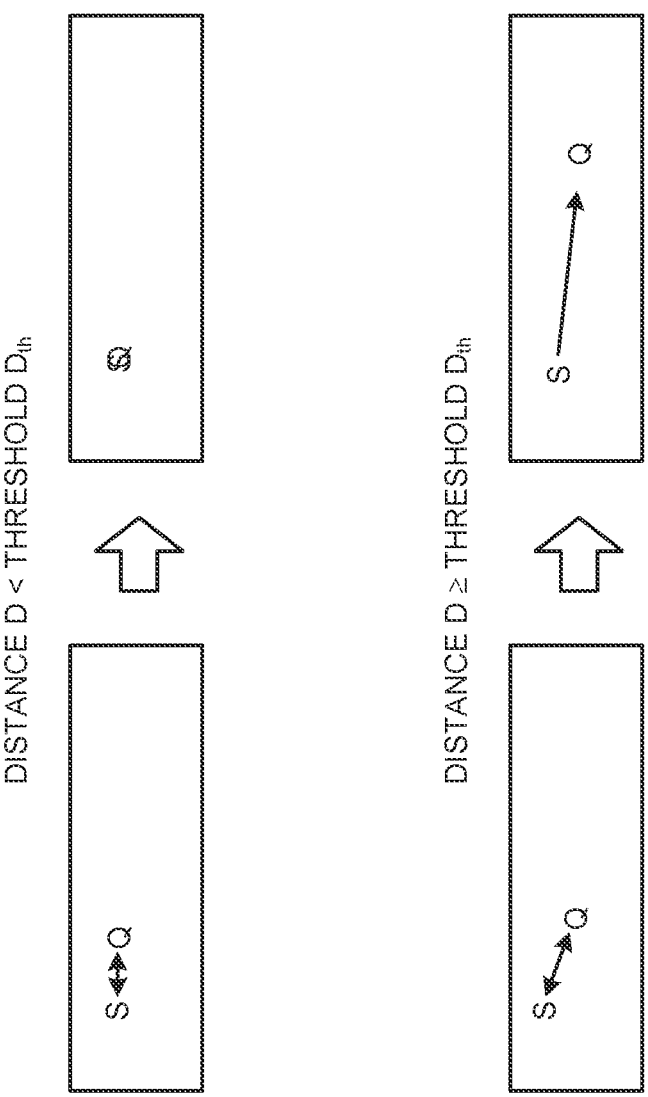
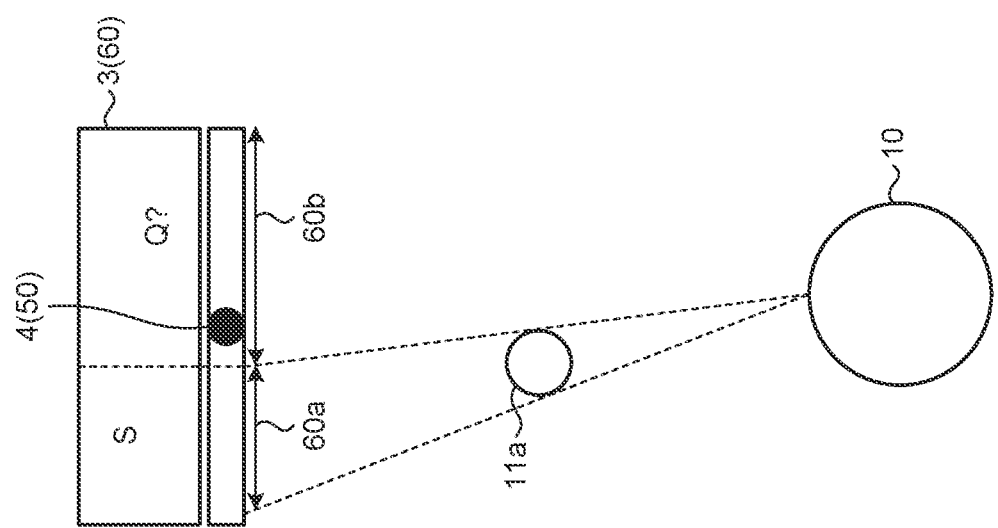

THREE-DIMENSIONAL IMAGE PROCESSING APPARATUS, SYSTEM, AND METHOD THEREOF

CROSS REFERENCE TO RELATED APPLICATIONS

This application is a U.S. National Phase of International Patent Application No. PCT/JP2020/044755 filed on Dec. 1, 2020, which claims priority benefit of Japanese Patent Application No. JP 2019-239640 filed in the Japan Patent Office on Dec. 27, 2019. Each of the above-referenced applications is hereby incorporated herein by reference in its entirety.

FIELD

The present invention relates to an image processing apparatus, an image processing method, and an image processing program.

BACKGROUND

Various techniques for displaying a three-dimensional image on a display have been proposed. Therefrom, proposals have also been made for autostereoscopic display without using a tool such as glasses. For example, as a display related to the autostereoscopic display, there is a Light Field display represented by a lenticular method.

In displaying a three-dimensional image on the Light Field display, right and left viewpoint positions of a user are detected, optimal light rays are collected at the viewpoint positions, and an image for the right eye and an image for the left eye are generated.

CITATION LIST

Patent Literature

Patent Literature 1: JP 2000-224612 A
Patent Literature 2: JP 2018-44824 A
Patent Literature 3: JP H9-54821 A

SUMMARY

Technical Problem

However, in the above conventional technique, there is room for improving a process of displaying the three-dimensional image.

Therefore, the present disclosure provides an image processing apparatus, an image processing method, and an image processing program that are configured to appropriately display a three-dimensional image for the user.

Solution to Problem

To solve the problems described above, an image processing apparatus according to an embodiment of the present disclosure includes: an imaging unit that images a user and a real object; an analysis unit that analyzes an attitude of the real object based on imaging information captured by the imaging unit; and a control unit that controls display of an image related to the real object based on the attitude of the real object.

BRIEF DESCRIPTION OF DRAWINGS

FIG. 6 is a table illustrating an example of a data structure of an analysis result table.

FIG. 15 is a diagram (2) illustrating processing performed by the control unit based on the control policy P5.

DESCRIPTION OF EMBODIMENTS

Figure 1:
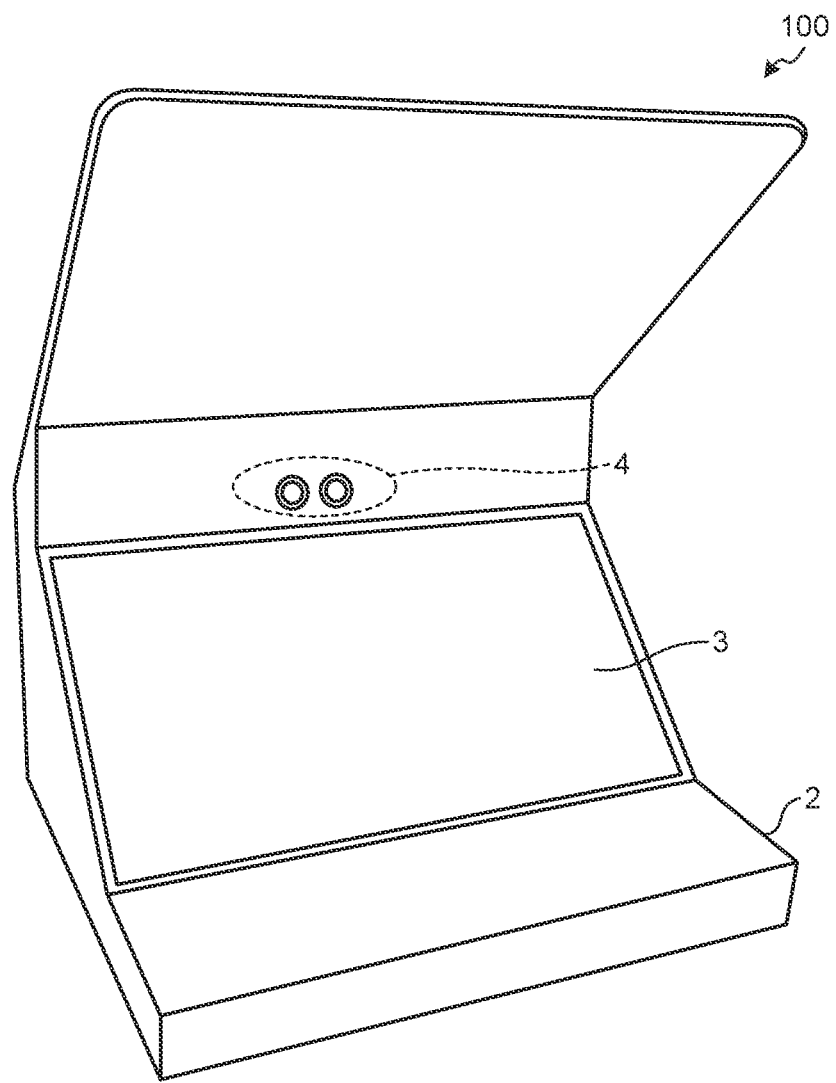
FIG. 1 is a diagram illustrating an example of the appearance of an image processing apparatus according to a first embodiment.

The embodiments of the present disclosure will be described in detail below with reference to the drawings. Note that in the following embodiments, the same portions are denoted by the same reference numerals or symbols, and a repetitive description thereof will be omitted.

Furthermore, the present disclosure will be described in the order of the items shown below.
1. First Embodiment
1.1. Example of Appearance of Image Processing Apparatus
1.2. Situation According to First Embodiment
1.3. Configuration of Image Processing Apparatus According to First Embodiment
1.4. Effects of Image Processing Apparatus According to First Embodiment
2. Second Embodiment
2.1. Situation According to Second Embodiment
2.2. Configuration of Image Processing Apparatus According to Second Embodiment
2.3. Effects of Image Processing Apparatus According to Second Embodiment
3. Third Embodiment
3.1. Situation According to Third Embodiment
3.2. Configuration of Image Processing Apparatus According to Third Embodiment]
3.3. Effects of Image Processing Apparatus According to Third Embodiment
4. Other Embodiments
5. Hardware configuration
6. Conclusion 1. First Embodiment 1.1. Example of Appearance of Image Processing Apparatus FIG. 1 is a diagram illustrating an example of the appearance of an image processing apparatus according to a first embodiment. An image processing apparatus 100 includes a base 2 and a display 3 that is raised upward from the base 2. The image processing apparatus 100 includes a camera (stereo camera) 4 on the upper side of the display 3. The camera 4 is configured to images a "user" in front of the display 3 and a "real object" held by the user.

The image processing apparatus 100 is configured to display a three-dimensional image using, for example, a lenticular method on the display 3. Roughly speaking, viewpoint positions of the user's naked eyes wearing no glasses or the like for stereoscopic display is detected using images captured by the camera 4. Images (parallax images) for the right and left eyes are generated with light rays collected at the respective viewpoint positions on the right and left sides, and the generated images are displayed on the display 3 on which a lenticular lens is mounted.

Figure 2:
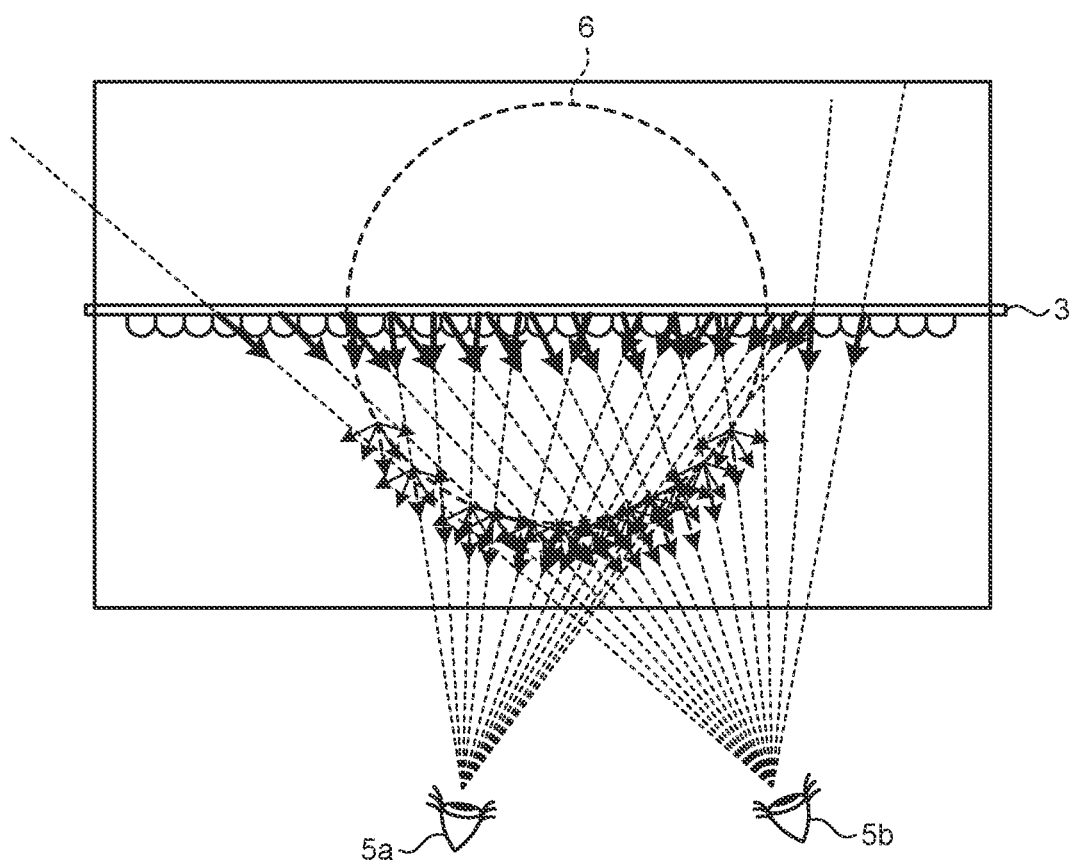
FIG. 2 is a diagram illustrating an example of three-dimensional image display by the image processing apparatus according to the first embodiment.

FIG. 2 is a diagram illustrating an example of three-dimensional image display by the image processing apparatus according to the first embodiment. As illustrated in FIG. 2, the image processing apparatus 100 detects the viewpoint positions (left eye 5a, right eye 5b) of the user on the basis of the images captured by the camera 4, and generates images (parallax images) for the right and left eyes with light rays collected at the respective viewpoint positions on the right and left sides. The image processing apparatus 100 displays the generated images on the display 3, and thus, the user can view a three-dimensional image 6 without using glasses, a head up display (HUD), or the like.

1.2. Situation According to First Embodiment

Figure 3:
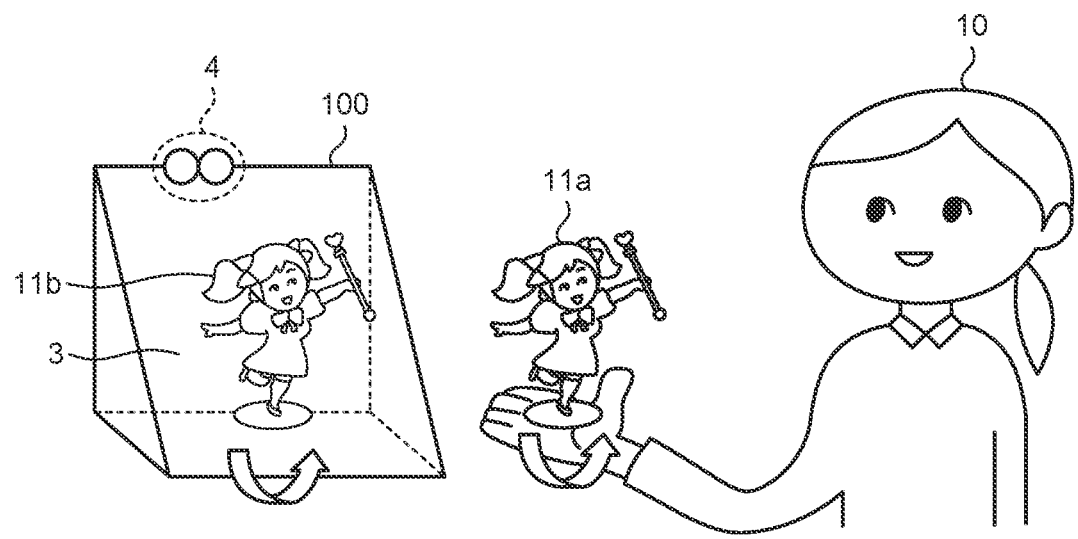
FIG. 3 is a diagram illustrating an example of a situation according to the first embodiment.

FIG. 3 is a diagram illustrating an example of a situation according to the first embodiment. As illustrated in FIG. 3, it is assumed that a user 10 is in front of the image processing apparatus 100, and the user 10 holds a real object 11a. The image processing apparatus 100 captures an image including the user 10 and the real object 11a by the camera 4. The image processing apparatus 100 generates an image (virtual object 11b) related to the real object 11a on the basis of the image (imaging information) captured by the camera 4, causing the display 3 to display the three-dimensional image of the virtual object 11b thereon. When the user 10 moves the real object 11a, the image processing apparatus 100 controls the movement of the virtual object 11b, according to the movement of the real object 11a.

Note that the real object 11a and the virtual object 11b may not be completely the same in shape. For example, the real object 11a may be a part (only a face or the like) of the virtual object 11b, and the shape of the real object 11a may be an approximate shape of the virtual object 11b. Note that the real object 11a may be a non-rigid object, and the user 10 may deform part of the shape of the real object 11a.

1.3. Configuration of Image Processing Apparatus According to First Embodiment

Figure 4:
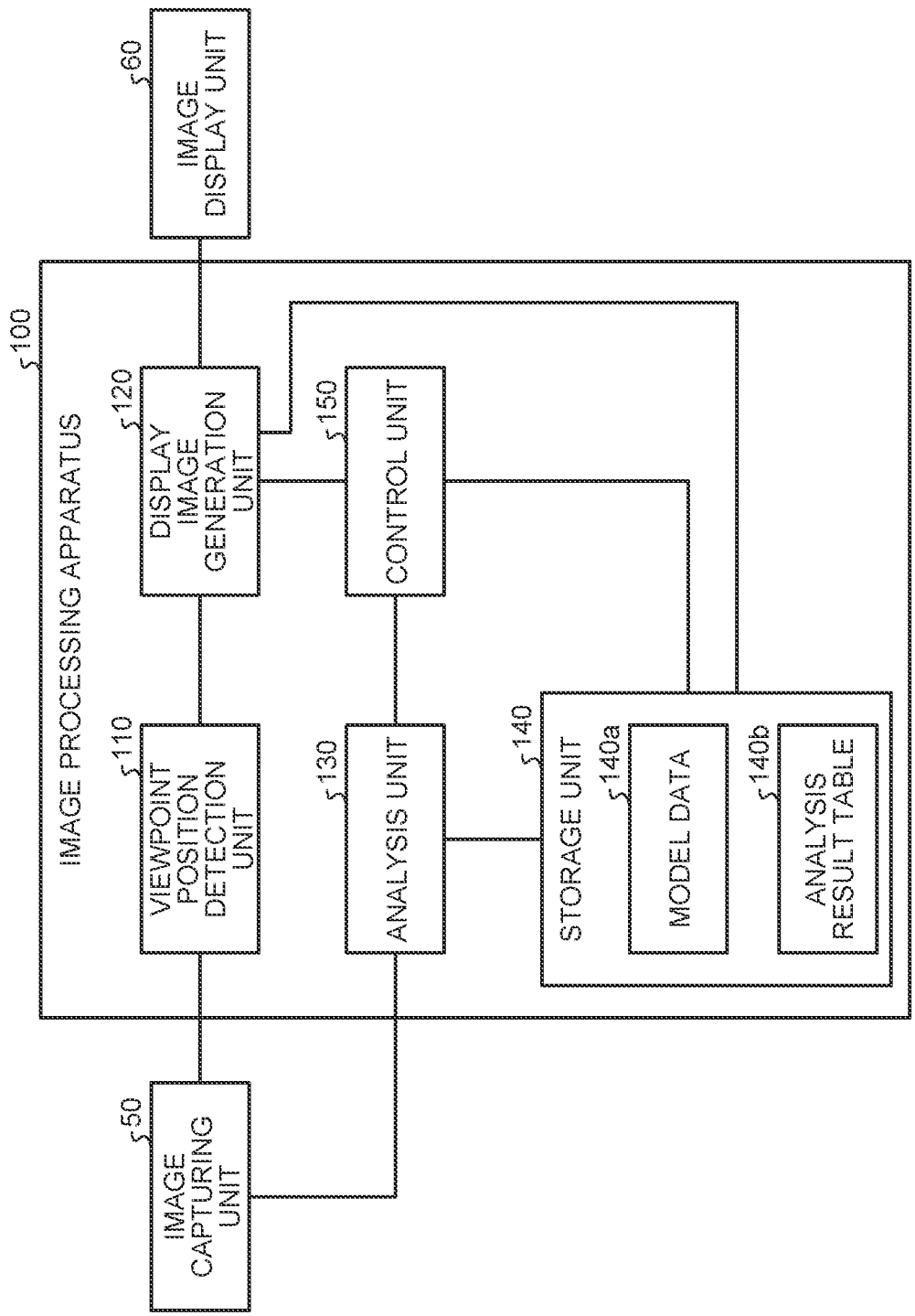
FIG. 4 is a diagram illustrating a configuration example of the image processing apparatus according to the first embodiment.

FIG. 4 is a diagram illustrating a configuration example of the image processing apparatus according to the first embodiment. As illustrated in FIG. 4, the image processing apparatus 100 is connected to an image capturing unit 50 and an image display unit 60. Note that the image processing apparatus 100 may include the image capturing unit 50 and the image display unit 60.

The image capturing unit 50 is a stereo camera imaging the user 10 and the real object 11a held by the user 10 that are within an imaging range. The image capturing unit 50 corresponds to the camera 4 illustrated in FIGS. 1 to 3. The image capturing unit 50 includes, for example, another image sensor such as a complementary metal oxide semiconductor (CMOS) sensor or a charge coupled device (CCD). The image capturing unit 50 outputs information about an image captured to the image processing apparatus 100. In the following description, the information about the image captured by the image capturing unit 50 is referred to as the "imaging information".

Since the image capturing unit 50 is the stereo camera, the imaging information includes an image captured by one of the cameras and an image captured by the other camera. The image capturing unit 50 captures an image at a predetermined frame rate (frame per second (fps)), and outputs the imaging information to the image processing apparatus 100 every time an image is captured. Frame numbers may be assigned to the imaging information in chronological order in ascending order.

The image display unit 60 is a display device that displays a three-dimensional image on the basis of information output from the image processing apparatus 100. The image display unit 60 corresponds to the display 3 illustrated in FIGS. 1 to 3. For example, the image display unit 60 displays the three-dimensional image of the virtual object 11b illustrated in FIG. 3.

The image processing apparatus 100 includes a viewpoint position detection unit 110, a display image generation unit 120, an analysis unit 130, a storage unit 140, and a control unit 150.

The viewpoint position detection unit 110 is a processing unit that performs face detection on the basis of the imaging information and detects the viewpoint positions of the user 10. The viewpoint positions detected by the viewpoint position detection unit 110 include the positions of the left and right eyes of the user 10. The viewpoint position detection unit 110 outputs viewpoint position information to the display image generation unit 120. For a method of detecting the user's face (face frame, coordinates of the left eye, and coordinates of the right eye) by the viewpoint position detection unit 110, a known method such as a method using image features is applicable. For example, the coordinates of the left eye and the coordinates of the right eye are two-dimensional coordinates.

The display image generation unit 120 is a processing unit that generates information for causing the image display unit 60 to display the three-dimensional image and outputs the generated information to the image display unit 60. For example, the display image generation unit 120 acquires the viewpoint position information from the viewpoint position detection unit 110, and transforms the two-dimensional coordinates indicating the viewpoint positions to viewpoint coordinates (three-dimensional coordinates) at a spatial position by applying a known method.

The display image generation unit 120 generates light ray (image) information on the basis of a relationship between information about the three-dimensional image determined by both model data 140a and control information and the viewpoint coordinates at the spatial position, outputs the light ray (image) information to the image display unit 60 to cause the image display unit 60 to display the light ray (image), thereby showing the three-dimensional image to the user 10.

Here, the model data 140a is information in which the shape, color, reference size, and the like of each portion of the virtual object 11b are defined in advance, and is stored in the storage unit 140. The display image generation unit 120 acquires the model data 140a from the storage unit 140.

The control information includes an attitude and display coordinates. The attitude is the attitude of the virtual object 11b. The attitude may be defined in any manner. For example, a difference from a reference position and a reference direction of each portion is specified as the attitude. The display coordinates indicate coordinates for displaying the virtual object 11b on a display screen of the image display unit 60. The display image generation unit 120 acquires the control information from the control unit 150 which is described later.

The analysis unit 130 is a processing unit that performs various analyses on the basis of the imaging information acquired from the image capturing unit 50 and outputs results of the analyses to the control unit 150. Hereinafter, various analysis processes performed by the analysis unit 130 will be described.

Figure 5:
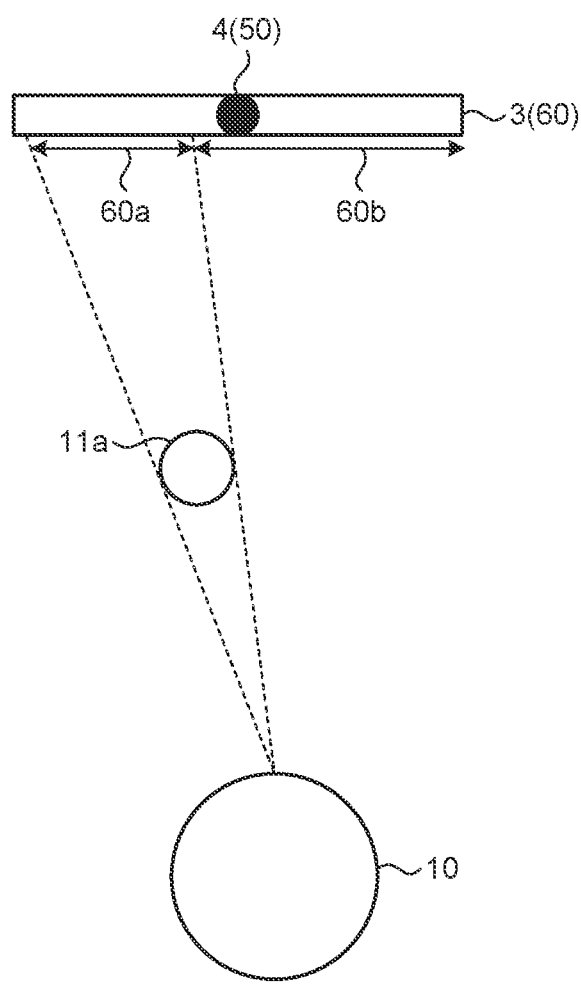
FIG. 5 is a diagram illustrating the processing by an analysis unit according to the first embodiment.

FIG. 5 is a diagram illustrating the processing by the analysis unit according to the first embodiment. In FIG. 5, the camera 4 corresponds to the image capturing unit 50, and the display 3 corresponds to the image display unit 60. It is assumed that the camera 4 is installed on the upper side of the display 3, and a distance between the display 3 and the user 10 and a distance between the camera 4 and the user 10 are the same. It is assumed that internal parameters of the camera 4 and an installation position (external parameter) of the camera 4 are known.

An example of "processing of detecting the real object 11a" by the analysis unit 130 will be described. The analysis unit 130 performs stereo matching for each portion (pixel) of the two images included in the imaging information to calculate a distance between the respective pixels. The analysis unit 130 detects, as the real object 11a, a region of pixels having a distance from the display 3 that is less than a threshold and having a difference in distance that is less than a threshold. The analysis unit 130 may detect the real object 11a from the imaging information by using any other known technique.

An example of "a process of calculating the attitude of the real object 11a" by the analysis unit 130 will be described. The analysis unit 130 detects a region of the real object 11a from the imaging information by the processing of detecting the real object 11a, and identifies the position of each portion of the real object 11a. The analysis unit 130 calculates, as the attitude of the real object 11a, a difference between the identified position of each portion and the reference position and reference direction of each portion set in advance.

An example of "a process of calculating the size of the real object 11a" by the analysis unit 130 will be described. The analysis unit 130 detects the region of the real object 11a from the imaging information through the processing of detecting the real object 11a The analysis unit 130 uses a conversion table in which a relationship between a size of a region in the imaging information and a size in a real space is defined, and calculates the size of the real object 11a in the real space from the size of the region of the real object 11a. For example, the analysis unit 130 sets a vertical width H and a horizontal width W of the real object 11a in the real space, as the size of the real object 11a.

An example of "a process of calculating the position of the real object 11a" by the analysis unit 130 will be described. The analysis unit 130 detects the region of the real object 11a from the imaging information through the processing of detecting the real object 11a The analysis unit 130 detects the center of gravity of the region of the real object 11a as the coordinates of the real object 11a. The analysis unit 130 uses a conversion table in which a relationship between coordinates (two-dimensional coordinates) in the imaging information and a position (three-dimensional coordinates) in the real space is defined, and calculates the position of the real object 11a in the real space from the coordinates in the imaging information.

An example of "a process of calculating a shielded area 60a and a non-shielded area 60b" by the analysis unit 130 will be described. The analysis unit 130 performs stereo matching for each portion of the two images included in the imaging information, and calculates a distance from the user 10 to the display 3 and a distance from the real object 11a to the display 3, which are included in the imaging information. In the following description, the distance between the user 10 and the display 3 is referred to as a "first distance". The distance between the real object 11a and the display 3 is referred to as a "second distance".

The analysis unit 130 calculates the shielded area 60a and the non-shielded area 60b from a geometric relationship between the size of the real object 11a, the viewpoint positions of the user 10, the first distance, and the second distance. The shielded area 60a indicates an area that the user 10 cannot view due to the real object 11a, of a display area of the display 3. The non-shielded area 60b indicates an area that the user 10 can view, of the display area of the display 3.

The analysis unit 130 calculates the size of the real object 11a by the process of calculating the size of the real object 11a. The process of calculating the viewpoint positions of the user 10 in the real space by the analysis unit 130 is similar to those of the viewpoint position detection unit 110 and the display image generation unit 120.

The analysis unit 130 repeatedly performs the above processes every time the imaging information is acquired from the image capturing unit 50, and outputs results of the analyses to the control unit 150. In addition, the analysis unit 130 may register some or all of the results of the analyses in an analysis result table of the storage unit 140. Furthermore, the analysis unit 130 may generate the model data 140a which is described later, on the basis of the images of the real object 11a included in the imaging information.

The storage unit 140 has the model data 140a and the analysis result table 140b. The storage unit 140 corresponds to a semiconductor memory device such as a random access memory (RAM) or flash memory, or a storage device such as a hard disk drive (HDD).

The model data 140a is information (3D model) in which the shape, color, the reference size, and the like of each portion of the virtual object 11b are defined. The storage unit 140 may include model data in addition to the model data about the virtual object 11b, and the display image generation unit 120 may select any of the model data.

The analysis result table 140b is a table that holds the results of the analyses by the analysis unit 130. FIG. 6 is a table illustrating an example of a data structure of the analysis result table. As illustrated in FIG. 6, the analysis result table 140b contains the frame numbers, positions, viewpoint positions, sizes, attitudes, shielded areas, and non-shielded areas.

In FIG. 6, each of the frame numbers is a frame number assigned to a set of imaging information, and is information for uniquely identifying the imaging information. A record (position, viewpoint positions, size, attitude, shielded area, and non-shielded area) corresponding to the same frame number is information obtained by analyzing the same imaging information.

In FIG. 6, the positions each indicates a position (three-dimensional coordinates) of the real object 11a in the real space. The respective viewpoint positions indicate viewpoint positions (coordinates of the left eye and coordinates of the right eye) of the user 10 in the real space. Each of the sizes indicates a size of the real object 11a in the real space, and is indicated by the vertical width H and the horizontal width W. Each of the attitudes indicates an attitude of the real object 11a, and is indicated by a difference θ between a position and direction of each portion detected on the basis of the real object 11a and the reference position and reference direction of each portion set in advance.

In FIG. 6, each of the shielded areas corresponds to the shielded area 60a in FIG. 5, and is indicated by coordinates of an upper left position and coordinates of a lower right position of the shielded area 60a. Each of the non-shielded area corresponds to the non-shielded area 60b in FIG. 5, and is indicated by coordinates of an upper left position and coordinates of a lower right position of the non-shielded area 60b.

The description returns to FIG. 4. The control unit 150 is a processing unit that generates the control information on the basis of the results of the analyses by the analysis unit 130 and outputs the generated control information to the display image generation unit 120. It is assumed that a plurality of control policies are prepared in the control unit 150 and the user 10 selects a desired control policy. Hereinafter, processes performed by the control unit 150 on the basis of control policies P1 to P8 will be individually described, but a process in which a plurality of policies are combined may be performed.

(Control Policy P1: Adjustment in Attitude)

In a case where the control policy P1 is selected, the control unit 150 performs control to match the attitude of the real object 11a with the attitude of the three-dimensional image (virtual object 11b) displayed on the image display unit 60. For example, the control unit 150 acquires the attitude (θ) of the real object 11a from the analysis unit 130, sets the acquired attitude in the control information, and outputs the control information to the display image generation unit 120. The display image generation unit 120 adjusts the attitude set to the model data 140a to match the attitude set in the control information, and uses the adjusted model data 140a to cause the image display unit 60 to display the three-dimensional image. Furthermore, on the basis of the viewpoint positions of the user 10, the control unit 150 is configured to determine the attitude of the virtual object 11b so that the attitude of the real object 11a and the attitude of the virtual object 11b look the same from the position of the user 10.

(Process Procedure Performed by Image Processing Apparatus Based on Control Policy P1)

Figure 7:
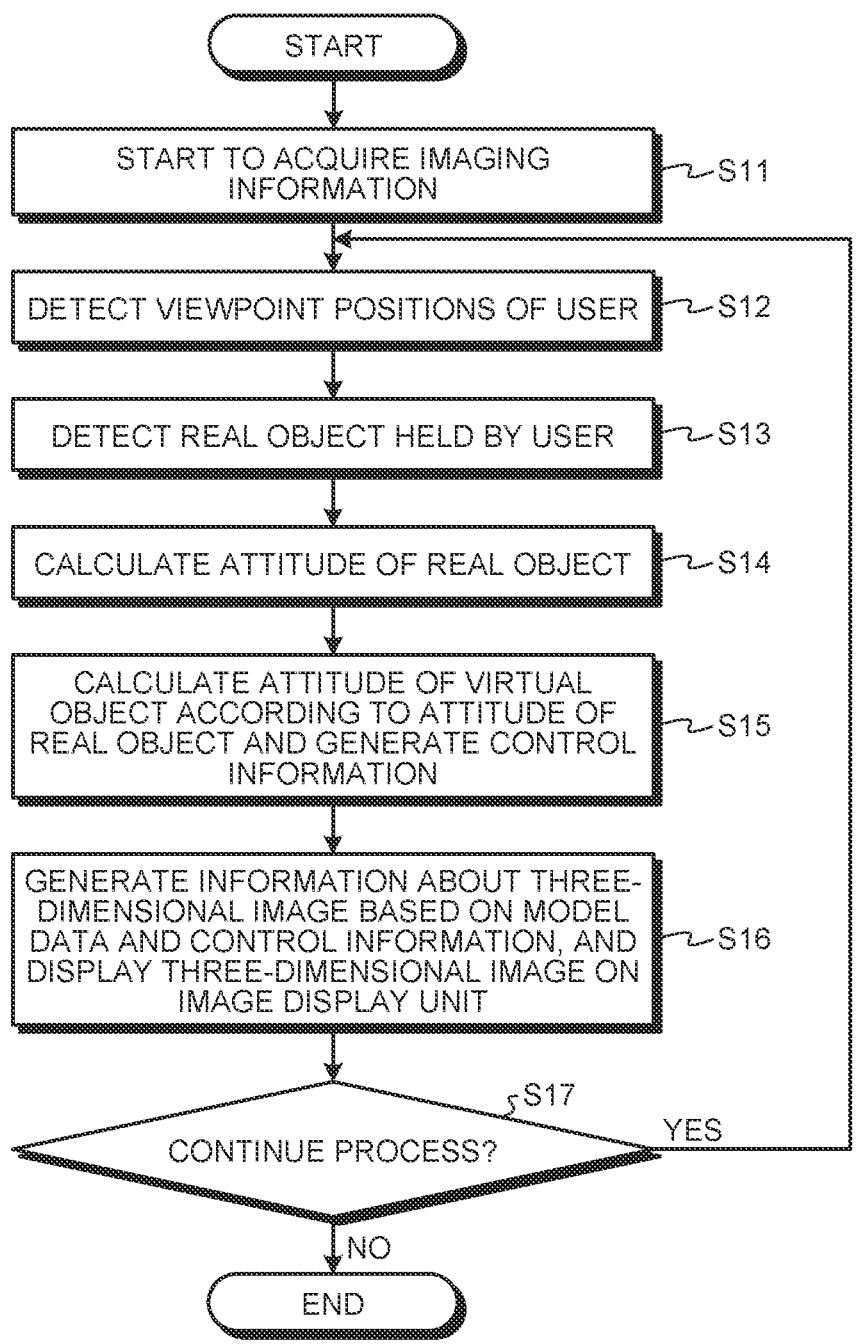
FIG. 7 is a flowchart illustrating a process procedure performed by the image processing apparatus based on a control policy P1.

FIG. 7 is a flowchart illustrating a process procedure performed by the image processing apparatus based on the control policy P1. As illustrated in FIG. 7, the image processing apparatus 100 starts acquisition of the imaging information from the image capturing unit 50 (Step S11). The viewpoint position detection unit 110 of the image processing apparatus 100 detects each viewpoint position of the user 10 (Step S12).

The analysis unit 130 of the image processing apparatus 100 detects the real object 11a held by the user 10 (Step S13). The analysis unit 130 calculates the attitude (θ) of the real object 11a (Step S14). The control unit 150 of the image processing apparatus 100 calculates the attitude of the virtual object 11b according to the attitude of the real object 11a to generate the control information (Step S15).

The display image generation unit 120 of the image processing apparatus 100 generates the information about the three-dimensional image on the basis of the model data 140a and the control information, and causes the image display unit 60 to display the three-dimensional image (Step S16).

When the process is continued (Step S17, Yes), the image processing apparatus 100 proceeds to Step S12. On the other hand, when the process is not continued (Step S17, No), the image processing apparatus 100 finishes the process.

The performance of the process by the image processing apparatus 100 according to the control policy P1 makes it possible for the user 10 to refers to the three-dimensional image of the virtual object 11b being in the same attitude as the attitude of the real object 11a held by the user, thus, supporting the work of the user 10.

(Control Policy P2: Adjustment in Size)

In a case where the control policy P2 is selected, the control unit 150 performs control to match the size of the real object 11a with the size of the three-dimensional image (virtual object 11b) displayed on the image display unit 60. For example, the control unit 150 acquires the size (H and W) of the real object 11a from the analysis unit 130, sets the acquired size in the control information, and outputs the control information to the display image generation unit 120. The display image generation unit 120 adjusts the size set to the model data 140a to match the size set in the control information, and uses the adjusted model data 140a to cause the image display unit 60 to display the three-dimensional image.

Figure 8:
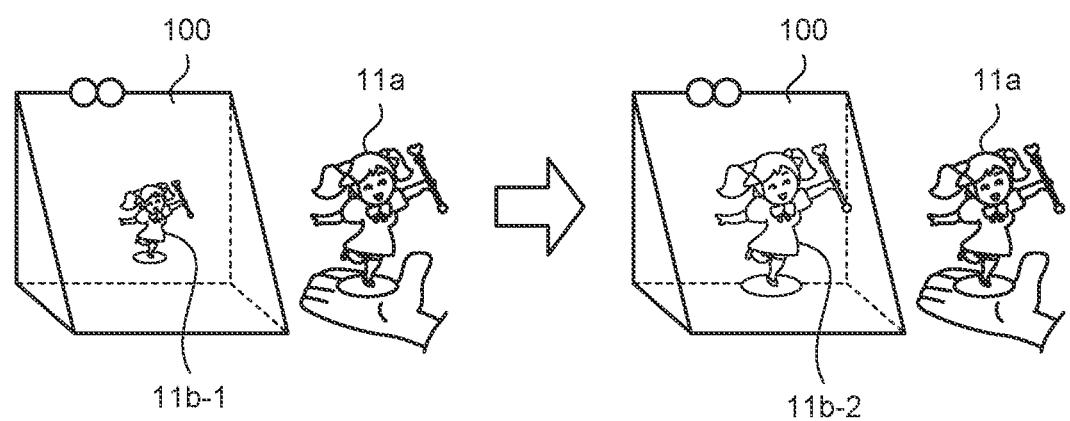
FIG. 8 is a diagram illustrating processing performed by a control unit based on a control policy P2.

FIG. 8 is a diagram illustrating processing performed by the control unit based on the control policy P2. As illustrated in FIG. 8, the size of a virtual object 11b-1 is different from the size of the real object 11a. The control unit 150 resizes the virtual object 11b-1 by the above processing to have a virtual object 11b-2, and the size of the virtual object 11b-1 and the size of the real object 11a become the same.

(Process Procedure Performed by Image Processing Apparatus Based on Control Policy P2)

Figure 9:
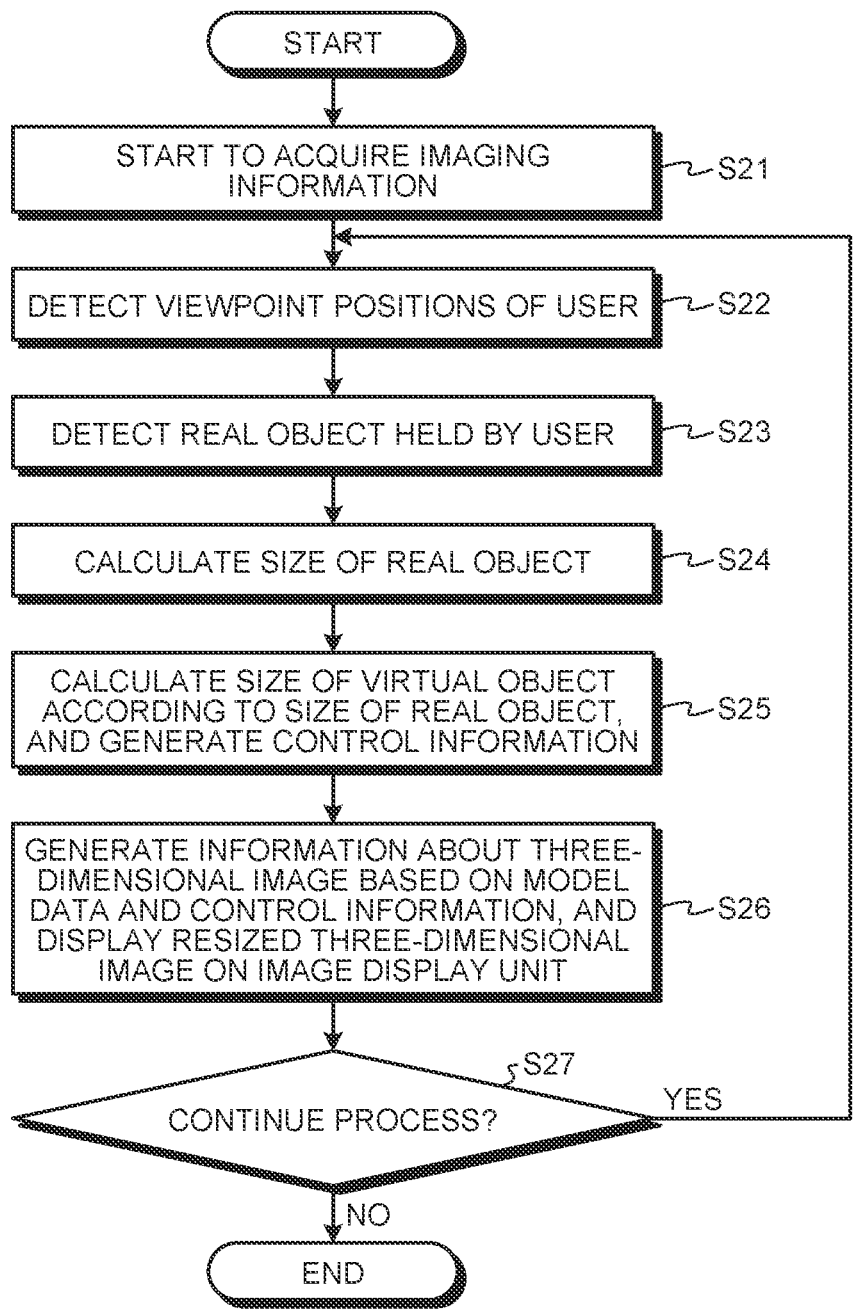
FIG. 9 is a flowchart illustrating a process procedure performed by the image processing apparatus based on the control policy P2.

FIG. 9 is a flowchart illustrating a process procedure performed by the image processing apparatus based on the control policy P2. As illustrated in FIG. 9, the image processing apparatus 100 starts acquisition of the imaging information from the image capturing unit 50 (Step S21). The viewpoint position detection unit 110 of the image processing apparatus 100 detects each viewpoint position of the user 10 (Step S22).

The analysis unit 130 of the image processing apparatus 100 detects the real object 11a held by the user 10 (Step S23). The analysis unit 130 calculates the size (H and W) of the real object 11a (Step S24). The control unit 150 of the image processing apparatus 100 calculates the size of the virtual object according to the size of the real object 11a to generate the control information (Step S25).

The display image generation unit 120 generates the information about the three-dimensional image on the basis of the model data 140a and the control information, and causes the image display unit 60 to display the resized three-dimensional image (Step S26).

When the process is continued (Step S27, Yes), the image processing apparatus 100 proceeds to Step S22. On the other hand, when the process is not continued (Step S27, No), the image processing apparatus 100 finishes the process.

The performance of the process by the image processing apparatus 100 according to the control policy P2 makes it possible for the user 10 to refers to the three-dimensional image of the virtual object 11b having the same size as that of the real object 11a held by the user, thus, supporting the work of the user 10.

(Control Policy P3: Adjustment in Apparent Size)

The real object 11a is positioned in front of the image display unit 60, and therefore, the three-dimensional image looks relatively small for the user 10 even if the real object 11a and the three-dimensional image (virtual object 11b) have the same size. Therefore, the control unit 150 performs control to adjust the relative sizes of the real object 11a and the three-dimensional image.

Figure 10:
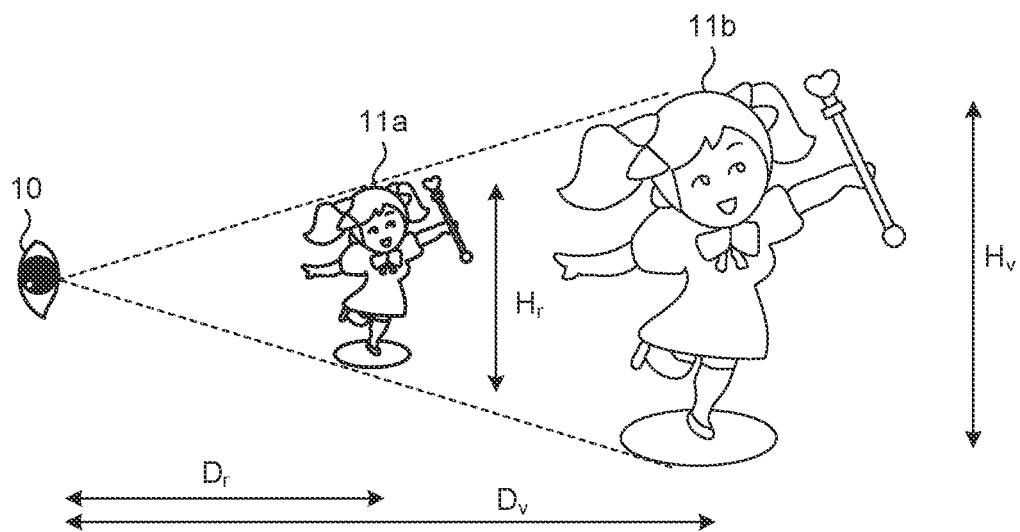
FIG. 10 is a diagram illustrating processing performed by the control unit based on a control policy P3.

FIG. 10 is a diagram illustrating processing performed by the control unit based on the control policy P3. The control unit 150 calculates a height Hv of the virtual object 11b on the basis of the results of the analyses. In FIG. 10, $H_r$ indicates a height of the real object 11a. $D_r$ indicates a distance between the real object 11a and the user 10, and corresponds to, for example, a distance obtained by subtracting the second distance from the first distance. Dv indicates a distance between the user 10 and the virtual object 11b (image display unit 60), and corresponds to, for example, the first distance.

The control unit 150 calculates the height $H_v$ of the virtual object 11b according to Formula (1). Although not illustrated, the control unit 150 calculates a width $W_v$ of the virtual object 11b according to Formula (2). In Formula (2), $W_r$ represents a width of the real object 11a. In the following description, the height $H_v$ and the width $W_v$ are collectively referred to as a "size after resizing".

$$H_v = H_r \times D_v / D_r \quad (1)$$

$$W_v = W_r \times D_v / D_r \quad (2)$$

The control unit 150 calculates the size after resizing by the above processing, sets the size after resizing in the control information, and outputs the control information to the display image generation unit 120. The display image generation unit 120 adjusts the size set in the model data 140a to match the size after resizing set in the control information, and uses the adjusted model data 140a to cause the image display unit 60 to display the three-dimensional image.

(Process Procedure Performed by Image Processing Apparatus Based on Control Policy P3)

Figure 11:
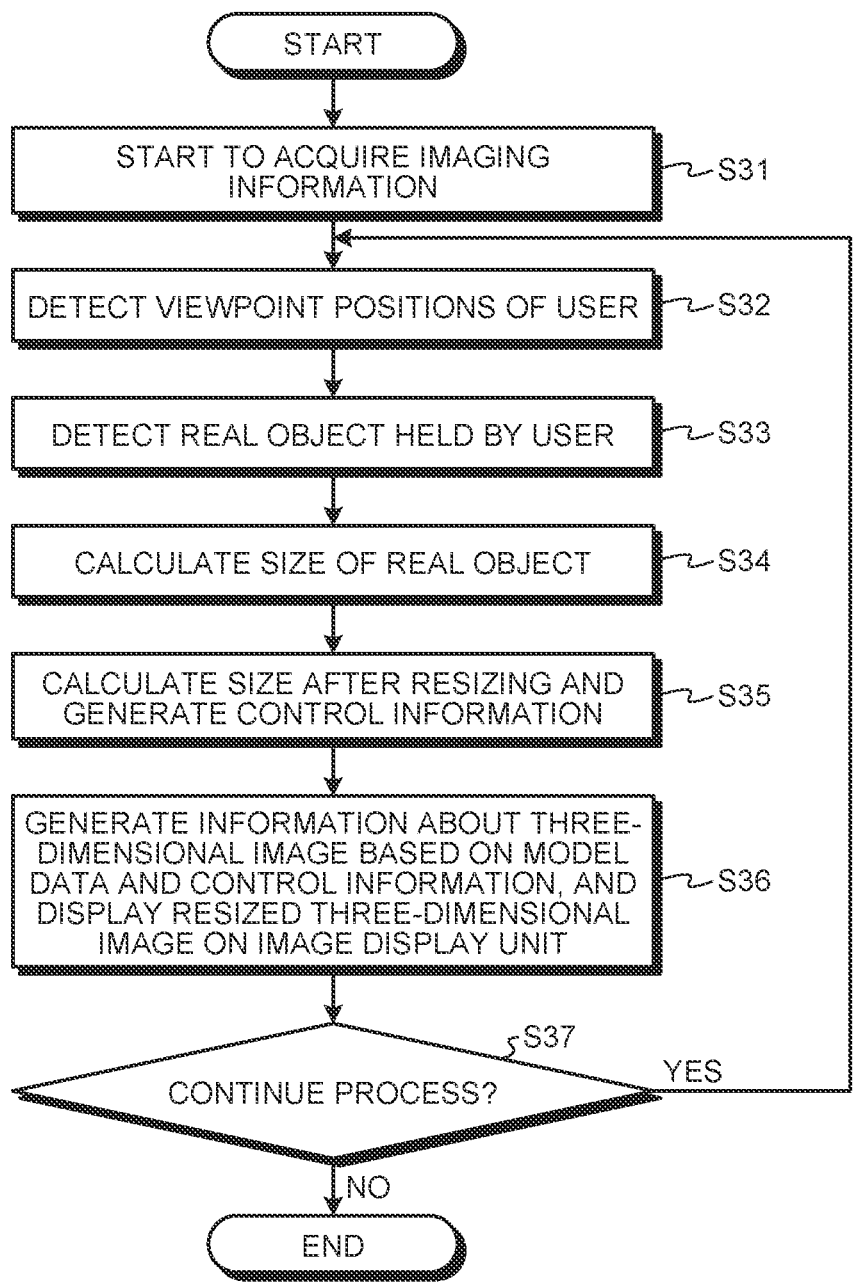
FIG. 11 is a flowchart illustrating a process procedure performed by the image processing apparatus based on the control policy P3.

FIG. 11 is a flowchart illustrating a process procedure performed by the image processing apparatus based on the control policy P3. As illustrated in FIG. 11, the image processing apparatus 100 starts acquisition of the imaging information from the image capturing unit 50 (Step S31). The viewpoint position detection unit 110 of the image processing apparatus 100 detects each viewpoint position of the user 10 (Step S32).

The analysis unit 130 of the image processing apparatus 100 detects the real object 11a held by the user 10 (Step S33). The analysis unit 130 calculates the size (H and W) of the real object 11a (Step S34). The control unit 150 of the image processing apparatus 100 calculates the size ($H_v$, $W_v$) after resizing and generates the control information (Step S35).

The display image generation unit 120 generates the information about the three-dimensional image on the basis of the model data 140a and the control information, and causes the image display unit 60 to display the resized three-dimensional image (Step S36).

When the process is continued (Step S37, Yes), the image processing apparatus 100 proceeds to Step S32. On the other hand, when the process is not continued (Step S37, No), the image processing apparatus 100 finishes the process.

Even if the real object 11a is positioned closer to the user 10 than to the image display unit 60, the performance of the process by the image processing apparatus 100 according to the control policy P3 makes it possible for the user 10 to refers to the three-dimensional image of the virtual object 11b having an apparent size the same as the size of the real object 11a held by the user, thus, supporting the work of the user 10.

(Control Policy P4: Movement to Position Free from Overlapping)

When the three-dimensional image of the virtual object 11b is displayed in the shielded area of the image display unit 60, the real object 11a overlaps the three-dimensional image. Therefore, the control unit 150 performs control to cause the three-dimensional image to be displayed in the non-shielded area of the image display unit 60.

Figure 12:
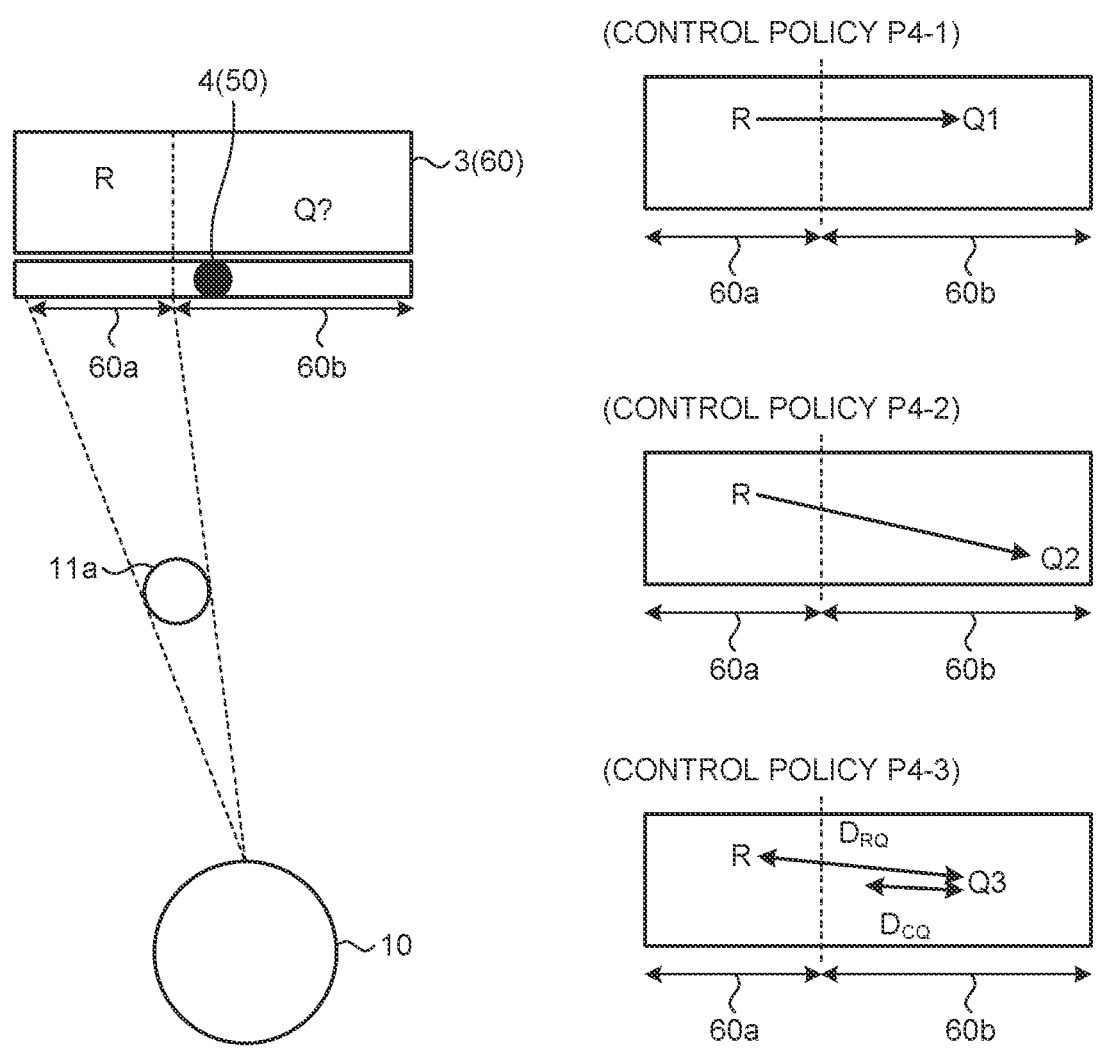
FIG. 12 is a diagram illustrating processing performed by the control unit based on the control policy P3.

FIG. 12 is a diagram illustrating processing performed by the control unit based on the control policy P4. As described above, the analysis unit 130 analyzes the imaging information to calculate the shielded area 60a and the non-shielded area 60b. The control unit 150 adjusts a display position of the three-dimensional image according to any one of a control policy P4-1, a control policy P4-2, and a control policy P4-3. The display position of the three-dimensional image before adjusting is denoted by "R". The display position of the three-dimensional image after adjusting is denoted by "Q".

The "control policy P4-1" will be described. The control unit 150 calculates a display position Q1 of the three-dimensional image at which the entire virtual object 11b is included in the non-shielded area 60b included in a result of the analysis. For example, the control unit 150 calculates the display position Q1 so that a distance from the position R to the display position Q1 is minimized.

The "control policy P4-2" will be described. The control unit 150 calculates a display position Q2 in the non-shielded area 60b so that a distance from the position R to the display position Q2 is maximized.

The "control policy P4-3" will be described. The control unit 150 calculates a display position Q3 that is closer to the center portion of the image display unit 60 (display 3). This is because the image quality of the three-dimensional image is improved toward the center of the display 3. For example, the control unit 150 calculates the display position Q3 on the basis of Formula (3).

$$C = \min(C_{RQ}(D_{RQ}) + C_{CQ}(D_{CQ})) \quad (3)$$

In Formula (3), $C_{RQ}$ ($D_{RQ}$) is a function with which the cost decreases as the display position Q3 determined by $D_{RQ}$ is farther from the shielded area 60a. $C_{CQ}$ ($D_{CQ}$) is a function indicating that a cost decreases as the display position Q3 determined by $D_{CQ}$ is closer to the center of display 3. The control unit 150 calculates a position where the value of Formula (3) is minimized as the final display position Q3.

The control unit 150 calculates a display position of the virtual object lib on the basis of any one of the control policies P4-1 to P4-3. The control unit 150 sets the calculated display position in the control information and outputs the control information to the display image generation unit 120. The display image generation unit 120 adjusts the display position of the three-dimensional image to the display position set in the control information and causes the image display unit 60 to display the three-dimensional image.

(Process Procedure Performed by Image Processing Apparatus Based on Control Policy P4)

Figure 13:
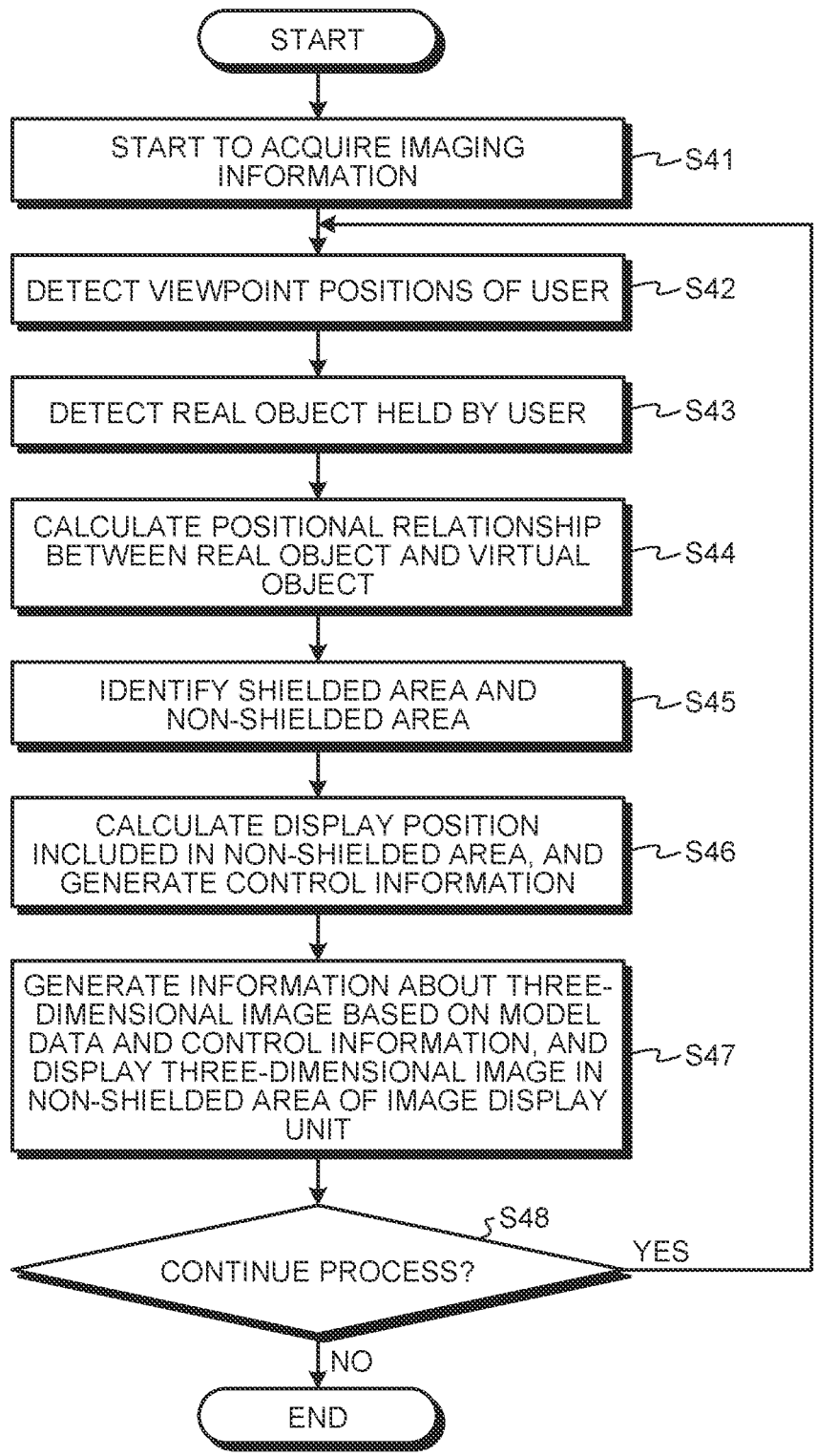
FIG. 13 is a flowchart illustrating a process procedure performed by the image processing apparatus based on a control policy P4.

FIG. 13 is a flowchart illustrating a process procedure performed by the image processing apparatus based on the control policy P4. As illustrated in FIG. 13, the image processing apparatus 100 starts acquisition of the imaging information from the image capturing unit 50 (Step S41). The viewpoint position detection unit 110 of the image processing apparatus 100 detects each viewpoint position of the user 10 (Step S42).

The analysis unit 130 of the image processing apparatus 100 detects the real object 11a held by the user 10 (Step S43). The analysis unit 130 calculates a positional relationship between the real object 11a and the virtual object 11b (Step S44). The control unit 150 of the image processing apparatus 100 identifies the shielded area and the non-shielded area (Step S45).

The control unit 150 calculates the display position included in the non-shielded area and generates the control information (Step S46). The display image generation unit 120 generates the information about the three-dimensional image on the basis of the model data 140a and the control information, and causes the image display unit 60 to display the three-dimensional image in the non-shielded area (Step S47).

When the process is continued (Step S48, Yes), the image processing apparatus 100 proceeds to Step S42. On the other hand, when the process is not continued (Step S48, No), the image processing apparatus 100 finishes the process.

The performance of the process by the image processing apparatus 100 according to the control policy P4 prevents overlapping of the real object 11a and the three-dimensional image (virtual object 11b), enables the user 10 to simultaneously refer to both the real object 11a and the three-dimensional image, supporting the work of the user 10.

(Control Policy P5: Automatic Selection of Overlapping/Non-Overlapping)

The work of the user 10 sometimes includes "viewing the real object 11a and the three-dimensional image in an overlapping manner" and "viewing the real object 11a and the three-dimensional image in an aligned manner". Therefore, the control unit 150 controls the display position of the three-dimensional image on the basis of a distance D between an apparent position of the real object 11a and the display position of the three-dimensional image. Here, in an example, the apparent position of the real object 11a is defined as a position where a straight line passing through the viewpoint position of the user 10 and the position of the real object 11a intersect the display 3.

Figure 14:
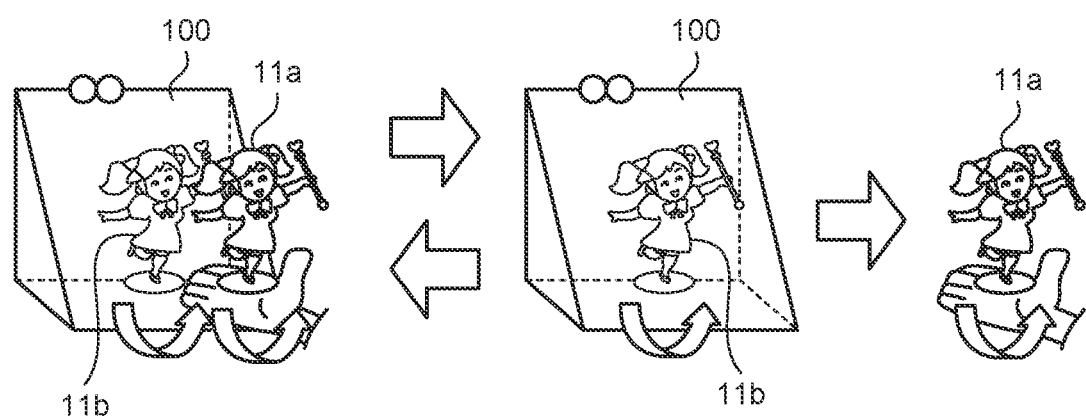
FIG. 14 is a diagram (1) illustrating processing performed by the control unit based on a control policy P5.

FIG. 14 is a diagram (1) illustrating processing performed by the control unit based on the control policy P5. As illustrated in FIG. 14, when a distance from the apparent position of the real object 11a to the virtual object 11b (three-dimensional image) is less than a threshold, the control unit 150 causes the virtual object 11b to be displayed in the shielded area. On the other hand, when the distance from the apparent position of the real object 11a to the virtual object 11b (three-dimensional image) is equal to or larger than the threshold, the control unit 150 causes the virtual object 11b to be displayed in the non-shielded area.

FIG. 15 is a diagram (2) illustrating processing performed by the control unit based on the control policy P5. In FIG. 15, the apparent position of the real object 11a is denoted by "S". The control unit 150 calculates the apparent position "S" on the basis of a relationship between the viewpoint position of the user 10, the position of the real object 11a in the space, and the position of the display 3. The position "Q" indicates the display position of the three-dimensional image.

The control unit 150 calculates the distance D between the position S and the position Q, and sets the display position of the three-dimensional image to the position S when the distance D is less than a threshold $D_{th}$. On the other hand, when the control unit 150 calculates the distance D between the position S and the position Q, and sets the display position of the display image so as to be in the non-shielded area 60b when the distance D is equal to or larger than the threshold $D_{th}$.

The control unit 150 calculates the display position of the three-dimensional image by the above processing, sets the display position in the control information, and outputs the control information to the display image generation unit 120. The display image generation unit 120 adjusts the display position of the three-dimensional image to the display position set in the control information and causes the image display unit 60 to display the three-dimensional image.

(Process Procedure Performed by Image Processing Apparatus Based on Control Policy P5)

Figure 16:
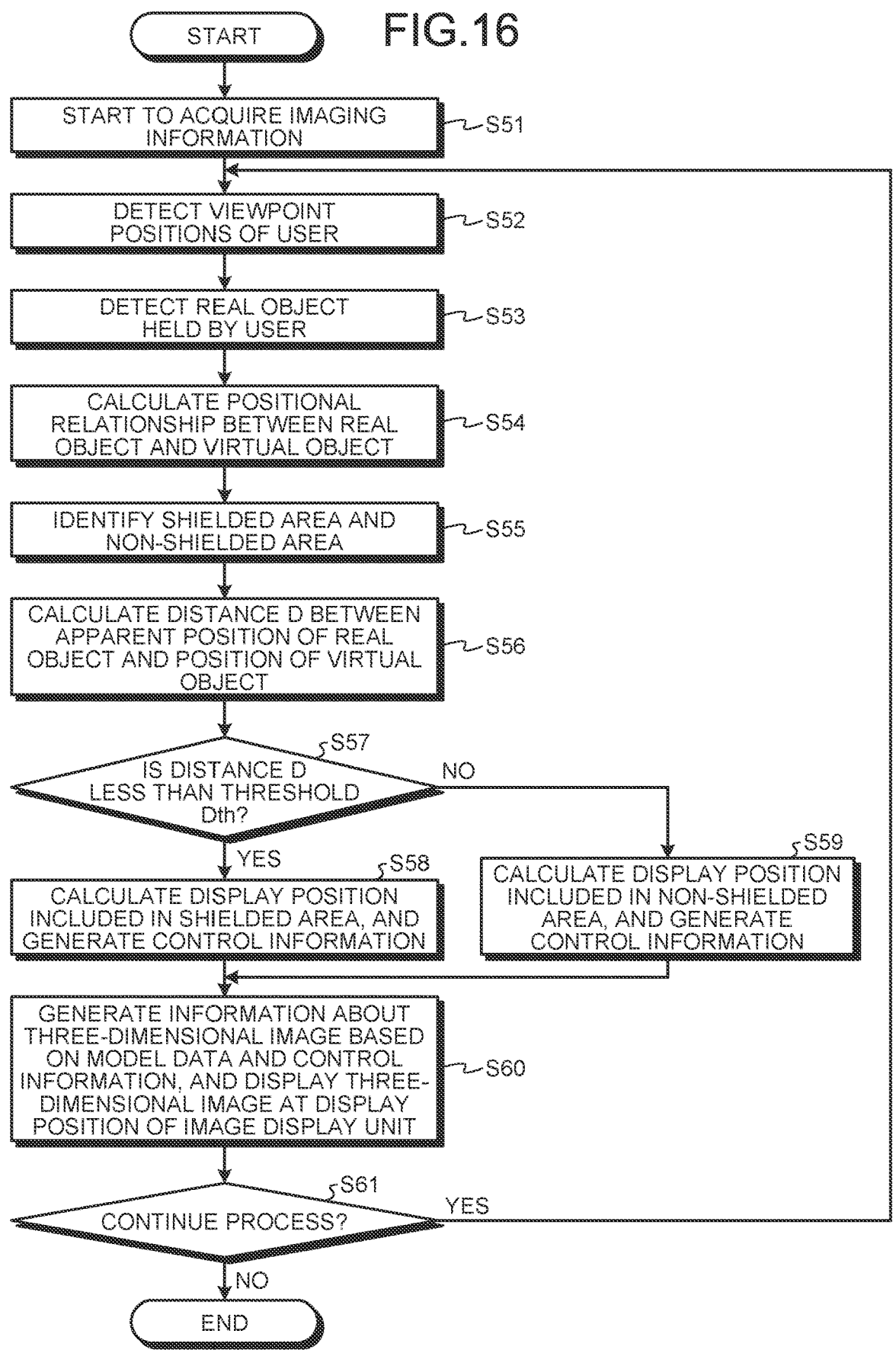
FIG. 16 is a flowchart illustrating a process procedure performed by the image processing apparatus based on the control policy P5.

FIG. 16 is a flowchart illustrating a process procedure performed by the image processing apparatus based on the control policy P5. As illustrated in FIG. 16, the image processing apparatus 100 starts acquisition of the imaging information from the image capturing unit 50 (Step S51). The viewpoint position detection unit 110 of the image processing apparatus 100 detects each viewpoint position of the user 10 (Step S52).

The analysis unit 130 of the image processing apparatus 100 detects the real object 11a held by the user 10 (Step S53). The analysis unit 130 calculates the positional relationship between the real object 11a and the virtual object 11b (Step S54). The control unit 150 of the image processing apparatus 100 identifies the shielded area and the non-shielded area (Step S55).

The control unit 150 calculates the distance D between the apparent position of the real object 11a and the position of the virtual object 11b (Step S56). The control unit 150 determines whether the distance D is less than the threshold $D_{th}$ (Step S57).

When the distance D is less than the threshold $D_{th}$ (Step S57, Yes), the control unit 150 calculates the display position included in the shielded area, generates the control information (Step S58), and proceeds to Step S60.

On the other hand, when the distance D is not less than the threshold $D_{th}$ (Step S57, No), the control unit 150 calculates the display position included in the non-shielded area, generates the control information (Step S59), and proceeds to Step S60.

The display image generation unit 120 generates the information about the three-dimensional image on the basis of the model data 140a and the control information, and causes the image display unit 60 to display the three-dimensional image at the display position (Step S60). When the process is continued (Step S60, Yes), the image processing apparatus 100 proceeds to Step S52. On the other hand, when the process is not continued (Step S48, No), the image processing apparatus 100 finishes the process.

The image processing apparatus 100 performs the process according to the control policy P5, and thus, the control unit 150 causes the virtual object 11b to be displayed in the shielded area when the distance from the apparent position of the real object 11a to the virtual object 11b (three-dimensional image) is less than the threshold. On the other hand, when the distance from the apparent position of the real object 11a to the virtual object 11b (three-dimensional image) is equal to or larger than the threshold, the control unit 150 causes the virtual object 11b to be displayed in the non-shielded area. This configuration makes it possible to support the work of the user 10, both for the "viewing the real object 11a and the three-dimensional image in an overlapping manner" and the "viewing the real object 11a and the three-dimensional image in an aligned manner".

(Control Policy P6: Motion Parallax)

For example, the user 10 fixes the viewpoint positions and moves and views the real object 11a. The control unit 150 shows a change corresponding to movement of the real object 11a by moving the display position of the virtual object 11b instead.

Figure 17:
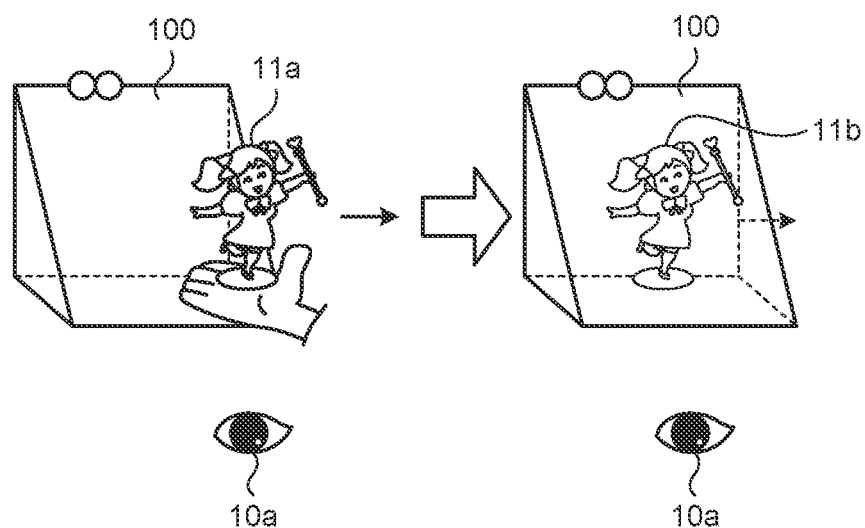
FIG. 17 is a diagram (1) illustrating processing performed by the control unit based on a control policy P6.

FIG. 17 is a diagram (1) illustrating processing performed by the control unit based on the control policy P6. As illustrated in FIG. 17, it is assumed that the user 10 moves the real object 11a in a "right direction". In this case, the control unit 150 moves the virtual object 11b in the "right direction" to show the change corresponding to the movement of the real object 11a by moving the display position of the virtual object instead.

Figure 18:
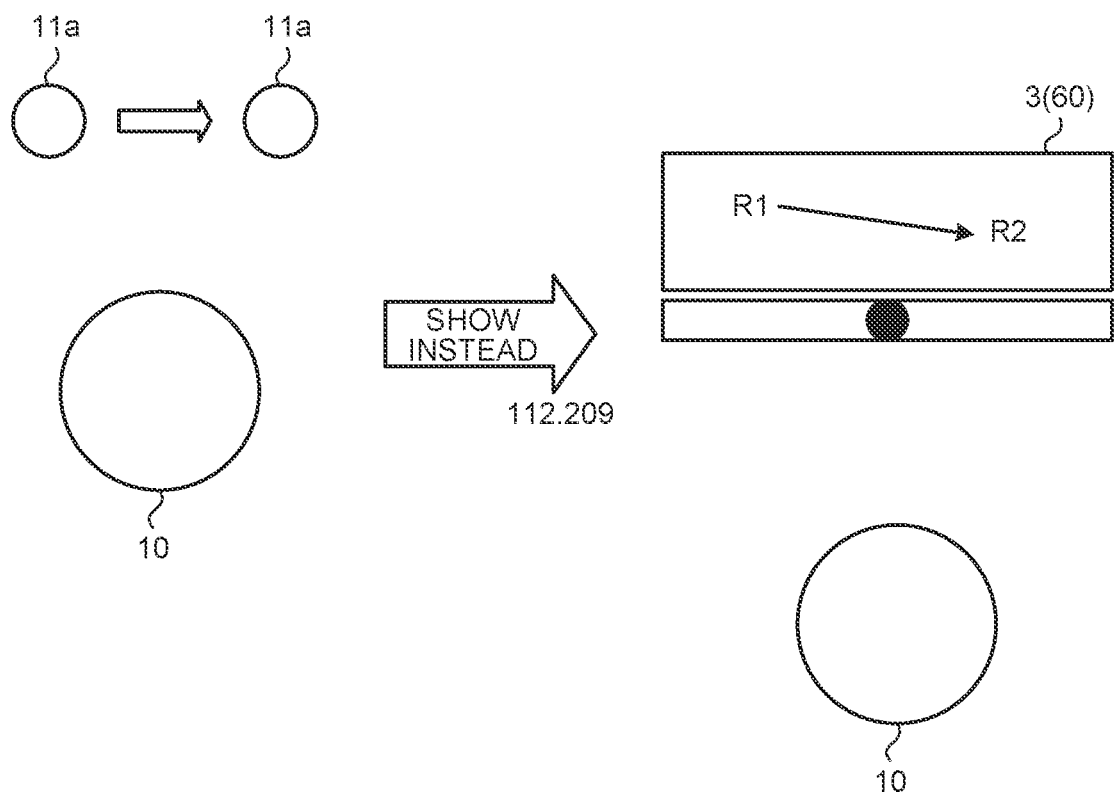
FIG. 18 is a diagram (2) illustrating processing performed by the control unit based on the control policy P6.

FIG. 18 is a diagram (2) illustrating processing performed by the control unit based on the control policy P6. As illustrated in FIG. 18, the user 10 moves the real object 11a to the right. If the viewpoint position of the user 10 does not move, the movement of the real object 11a to the right makes it possible to refer to a left side surface of the real object 11a. The control unit 150 moves the display position of the virtual object 11b from a position R1 to a position R2, and therefore, the user 10 is allowed to refer to the left side surface of the virtual object 11b. In other words, the change corresponding to the movement of the real object 11a is shown by moving the display position of the virtual object 11b instead.

The control unit 150 calculates a movement trajectory of the real object 11a on the basis of the positions of the real object included in results of the analyses for the respective imaging information, and calculates the movement of the virtual object 11b. For example, the control unit 150 transforms the movement trajectory in a predetermined period to a coordinate system of the image display unit 60 to calculate the movement of the virtual object 11b. Motion information about the virtual object 11b includes information in which a plurality of coordinates on the image display unit 60 is arranged in chronological order.

The control unit 150 calculates the movement of the virtual object 11b by the above processing, sets the movement of the virtual object 11b in the control information, and outputs the control information to the display image generation unit 120. The display image generation unit 120 moves the three-dimensional image displayed on the image display unit 60, on the basis of the movement set in the control information.

(Process Procedure Performed by Image Processing Apparatus Based on Control Policy P6)

Figure 19:
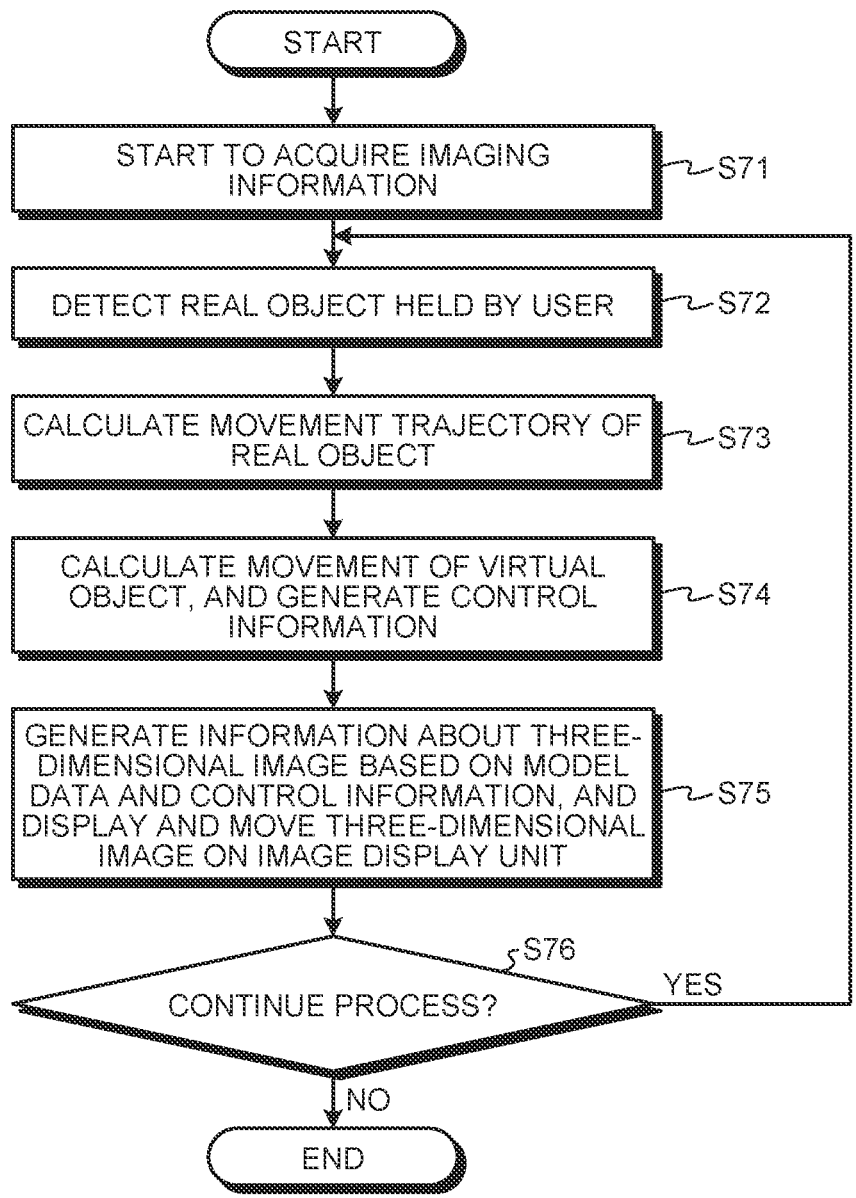
FIG. 19 is a flowchart illustrating a process procedure performed by the image processing apparatus based on the control policy P6.

FIG. 19 is a flowchart illustrating a process procedure performed by the image processing apparatus based on the control policy P6. As illustrated in FIG. 19, the image processing apparatus 100 starts acquisition of the imaging information from the image capturing unit 50 (Step S71). The analysis unit 130 of the image processing apparatus 100 detects the real object 11a held by the user 10 (Step S72).

The control unit 150 of the image processing apparatus 100 calculates the movement trajectory of the real object 11a on the basis of results of the analyses (Step S73). The control unit 150 calculates the movement of the virtual object 11b and generates the control information (Step S74).

The display image generation unit 120 generates the information about the three-dimensional image on the basis of the model data 140a and the control information, and causes the image display unit 60 to display and move the three-dimensional image (Step S75).

When the process is continued (Step S76, Yes), the image processing apparatus 100 proceeds to Step S72. On the other hand, when the process is not continued (Step S76, No), the image processing apparatus 100 finishes the process.

The performance of the process by the image processing apparatus 100 according to the control policy P6 makes it possible to show the change corresponding to the movement of the real object 11a by moving the display position of the virtual object 11b instead, supporting the work of the user 10.

(Control Policy P7: Recording/Reproducing Movement)

For example, as described above, the analysis unit 130 records the results (the position of the real object 11a) of the analyses of the respective imaging information in the analysis result table 140b in chronological order. The control unit 150 calculates the movement of the real object 11a on the basis of the positions of the real object 11a in a certain period, recorded in the analysis result table 140b. The control unit 150 calculates the movement of the virtual object 11b on the basis of the movement of the real object 11a, and moves the virtual object 11b on the basis of this movement, whereby the movement of the real object 11a in the past can be reproduced.

Here, in a case where the movement of the real object 11a is used, the analysis unit 130 may calculate moving average of the real object 11a to remove noise. In addition, the analysis unit 130 may record different movements of the real object 11a and combine the recorded positions to edit the different short movements into a series of motion information. For example, the analysis unit 130 may combine the movement trajectory during a first period, a second period, and a third period.

Figure 20:
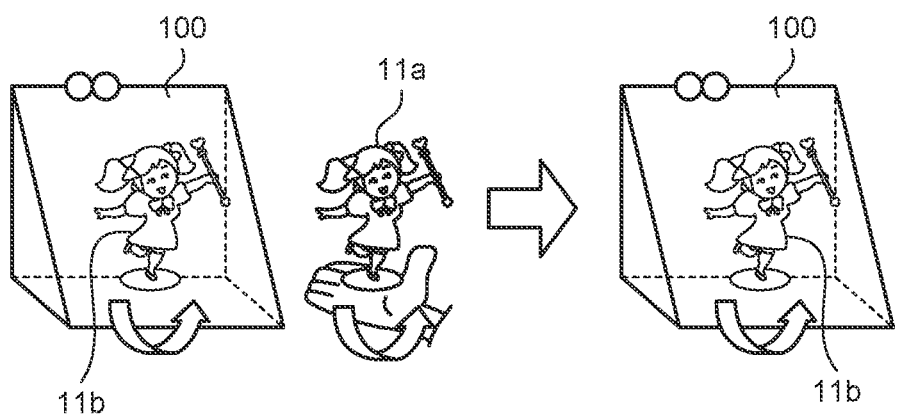
FIG. 20 is a diagram illustrating processing performed by the control unit based on a control policy P7.

FIG. 20 is a diagram illustrating processing performed by the control unit based on the control policy P7. The user 10 moves the real object 11a for the certain period, and the analysis unit 130 records the movement of the real object 11a (positions indicated by the frame numbers) in the analysis result table 140b on the basis of the imaging information. The control unit 150 calculates the movement of the virtual object 11b on the basis of the movement of the real object 11a in the certain period, recorded in the analysis result table 140b, and generates the control information for moving the virtual object 11b on the basis of this movement. For example, the control unit 150 performs calculation to transform the position (position in the real space) of each frame that forms the movement of the real object 11a to the coordinate system of the display screen of an image display unit 61. It is assumed that a relationship between the position in the real space and the coordinates of the display screen is defined in advance.

(Process Procedure Performed by Image Processing Apparatus Based on Control Policy P7)

Figure 21:
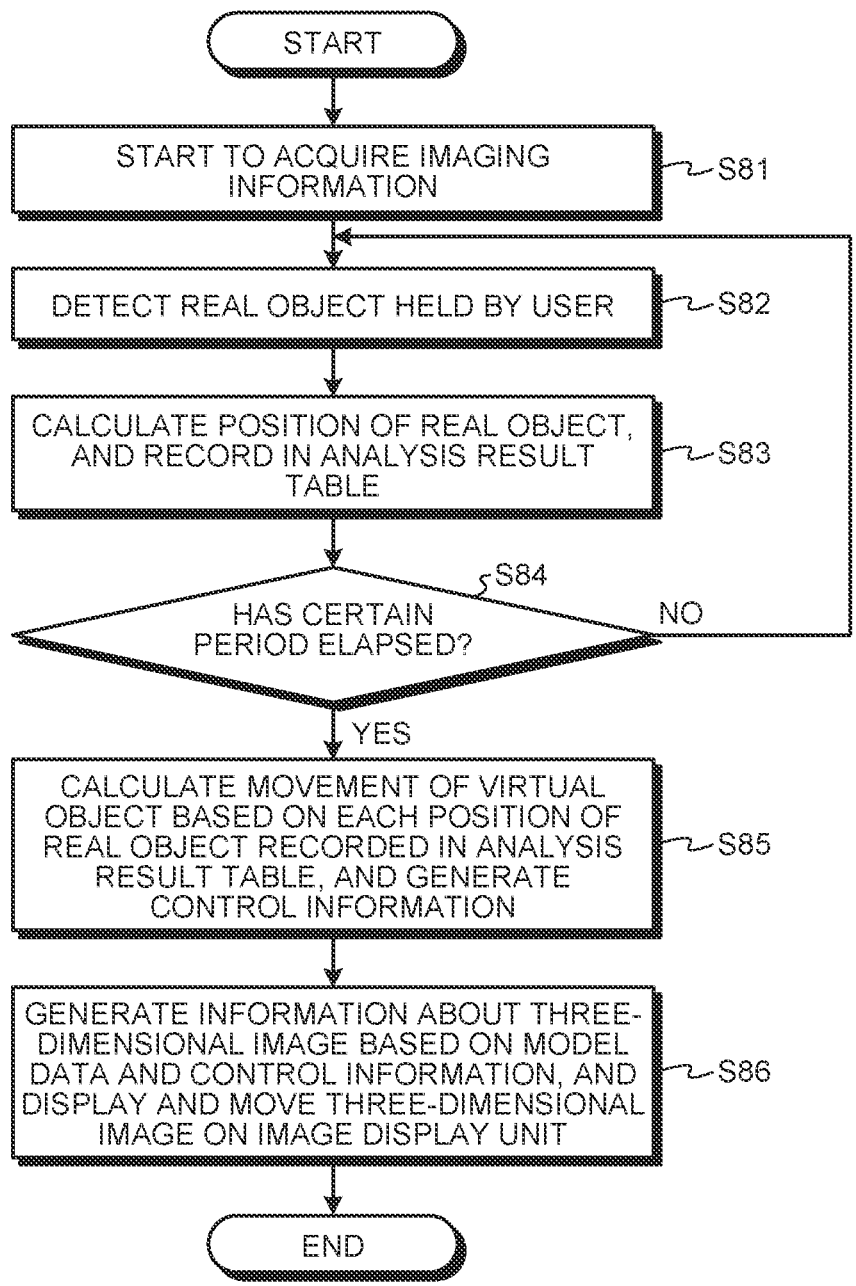
FIG. 21 is a flowchart illustrating a process procedure performed by the image processing apparatus based on the control policy P7.

FIG. 21 is a flowchart illustrating a process procedure performed by the image processing apparatus based on the control policy P7. As illustrated in FIG. 21, the image processing apparatus 100 starts acquisition of the imaging information from the image capturing unit 50 (Step S81). The analysis unit 130 of the image processing apparatus 100 detects the real object 11a held by the user 10 (Step S82).

The analysis unit 130 calculates the position of the real object 11a and records the position in the analysis result table 140b (Step S83). When the certain period has not elapsed (Step S84, No), the image processing apparatus 100 proceeds to Step S82. On the other hand, when the certain period has elapsed (Step S84, Yes), the image processing apparatus 100 proceeds to Step S85.

The control unit 150 of the image processing apparatus 100 calculates the movement of the virtual object 11b on the basis of each position of the real object 11a recorded in the analysis result table 140b, and generates the control information (Step S85). The display image generation unit 120 generates the information about the three-dimensional image on the basis of the model data 140a and the control information, and causes the image display unit 60 to display and move the three-dimensional image (Step S86).

The performance of the process by the image processing apparatus 100 according to the control policy P7 to record the movement of the real object 11a for a certain period, calculates the movement of the virtual object 11b on the basis of the recorded motion, and controls the movement of the three-dimensional image. This configuration makes it possible to reproduce the movement of the real object 11a in the past with the virtual object 11b.

(Control Policy P8: Illumination)

In a case where specification of illumination position and illumination color is received from outside, the control unit 150 calculates the color of and a reflection position on the virtual object 11b on the basis of the illumination position and illumination color, and generates the control information. The display image generation unit 120 generates the information about the three-dimensional image on the basis of the color of and the reflection position on the virtual object 11b set in the control information, and causes the image display unit 60 to display the information.

Figure 22:
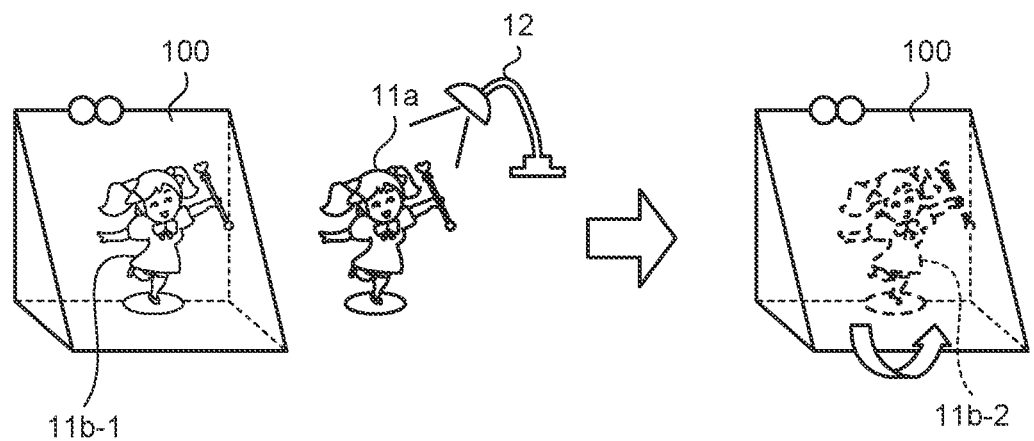
FIG. 22 is a diagram illustrating processing performed by the control unit based on a control policy P8.

FIG. 22 is a diagram illustrating processing performed by the control unit based on the control policy P8. The user 10 specifies the illumination position of an illumination lamp 12 and the illumination color, to the image processing apparatus 100, with an input device (not illustrated) or the like. Furthermore, the analysis unit 130 may estimate the illumination position and the illumination color by using the imaging information and output information about the analyzed illumination position and illumination color to the control unit 150. The control unit 150 calculates the color of and the reflection position on the virtual object 11b-1 on the basis of the illumination position and the illumination color. The display image generation unit 120 performs correction to add effects (color and gloss) to the virtual object 11b-1 on the basis of the color and reflection position calculated by the analysis unit 130, generates the virtual object 11b-2, and causes the image display unit 60 to display the virtual object 11b-2.

When the color of the real object 11a changes, the control unit 150 changes the color of the virtual object 11b-2. Furthermore, when the illumination position changes, the control unit 150 may change the position of specular reflection on the virtual object 11b-2.

(Process Procedure Performed by Image Processing Apparatus Based on Control Policy P8)

Figure 23:
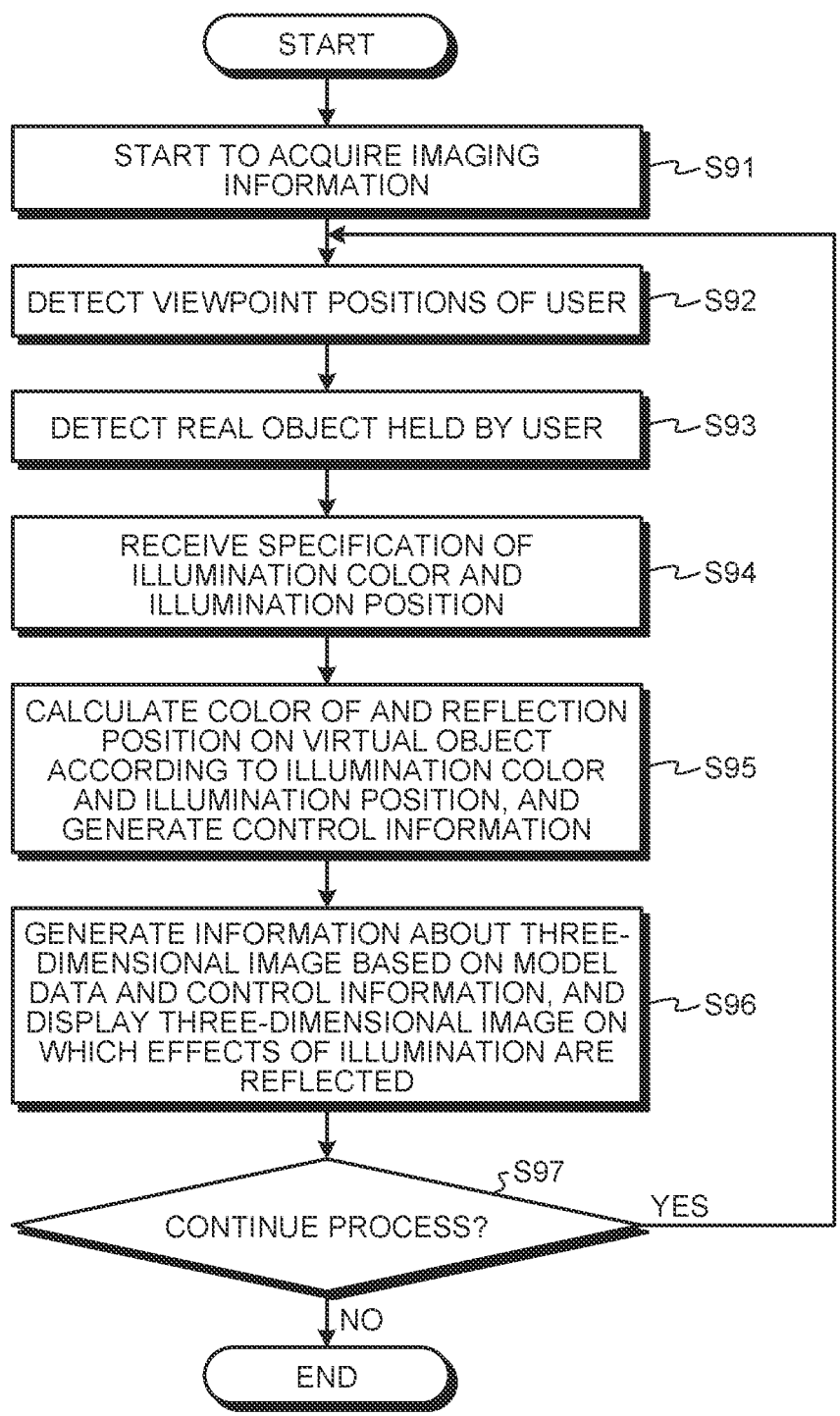
FIG. 23 is a flowchart illustrating a process procedure performed by the image processing apparatus based on the control policy P8.

FIG. 23 is a flowchart illustrating a process procedure performed by the image processing apparatus based on the control policy P8. As illustrated in FIG. 23, the image processing apparatus 100 starts acquisition of the imaging information from the image capturing unit 50 (Step S91). The viewpoint position detection unit 110 of the image processing apparatus 100 detects each viewpoint position of the user 10 (Step S92).

The analysis unit 130 of the image processing apparatus 100 detects the real object 11a held by the user 10 (Step S93). The control unit 150 of the image processing apparatus 100 receives the specification of the illumination color and the illumination position (or the analysis unit 130 estimates the illumination position and the illumination color by using the imaging information, and outputs the information about the analyzed illumination position and illumination color to the control unit 150) (Step S94). The control unit 150 calculates the color of and the reflection position on the virtual object 11b according to the illumination color and the illumination position, and generates the control information (Step S95).

The display image generation unit 120 generates the information about the three-dimensional image on the basis of the model data 140a and the control information, and displays the three-dimensional image on which the effects of the illumination are reflected (Step S96).

When the process is continued (Step S97, Yes), the image processing apparatus 100 proceeds to Step S92. On the other hand, when the process is not continued (Step S97, No), the image processing apparatus 100 finishes the process.

The performance of the process by the image processing apparatus 100 according to the control policy P8 makes it possible to reflect the effects of the illumination similar to those in illuminating the real object 11a, in the virtual object 11b.

1.4. Effects of Image Processing Apparatus According to First Embodiment

As described above, in the image processing apparatus according to the first embodiment, the analysis unit 130 analyzes the imaging information, and the control unit 150 generates the control information based on the control policies P1 to P8, on the basis of the results of the analyses and controls the display of the three-dimensional image, and therefore, the three-dimensional image can be appropriately displayed for the user. For example, in a case where the real object 11a having a 3D shape is displayed as the virtual object 11b, on the image display unit 60, the above processing makes it possible to automatically assist the work of viewing and comparing the real object 11a and the virtual object 11b simultaneously can be automatically, improving working efficiency for the user.

2. Second Embodiment

2.1. Situation According to Second Embodiment

Figure 24:
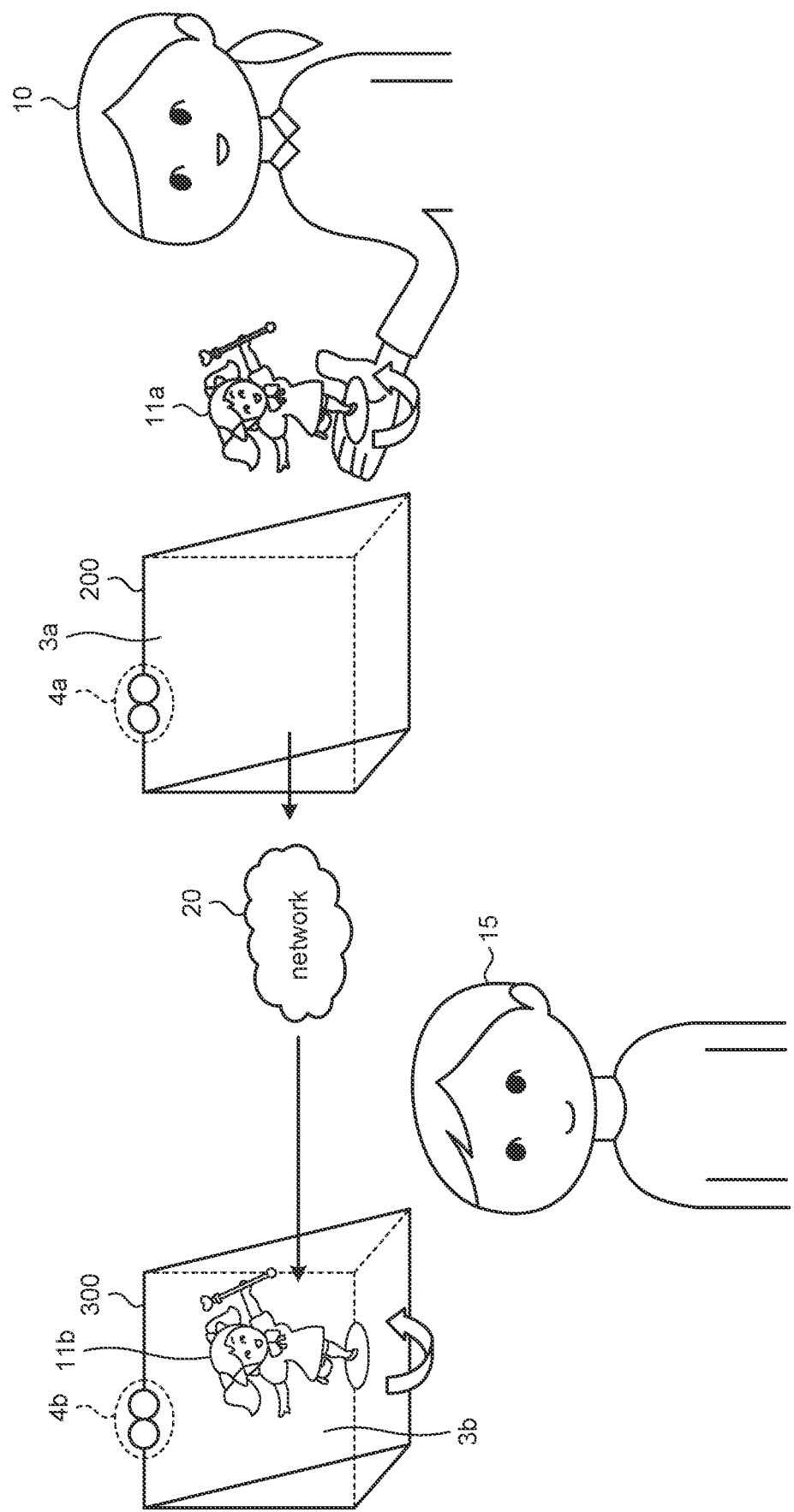
FIG. 24 is a diagram illustrating an example of a situation according to a second embodiment.

FIG. 24 is a diagram illustrating an example of a situation according to a second embodiment. As illustrated in FIG. 24, an image processing apparatus 200 and an image processing apparatus 300 are connected to each other via a network 20.

It is assumed that the user 10 is in front of the image processing apparatus 200, and the user 10 holds the real object 11a. The image processing apparatus 200 images the real object 11a by a camera 4a and calculates the movement of the real object 11a. The image processing apparatus 200 sets motion information about the real object 11a in the control information and transmits the control information to the image processing apparatus 300. The image processing apparatus 200 may display the three-dimensional image of the virtual object 11b on a display 3a as in the image processing apparatus 100 according to the first embodiment.

Note that the image processing apparatus 300 may perform processing similar to that of the image processing apparatus 100 by using a camera 4b, separately from the above processing.

When receiving the control information, the image processing apparatus 300 displays the three-dimensional image of the virtual object 11b on a display 3b, on the basis of the model data about the virtual object 11b and the control information. The motion information about the real object 11a is set in the control information, and the image processing apparatus 300 controls the movement of the virtual object 11b according to the movement of the real object 11a.

Figure 25:
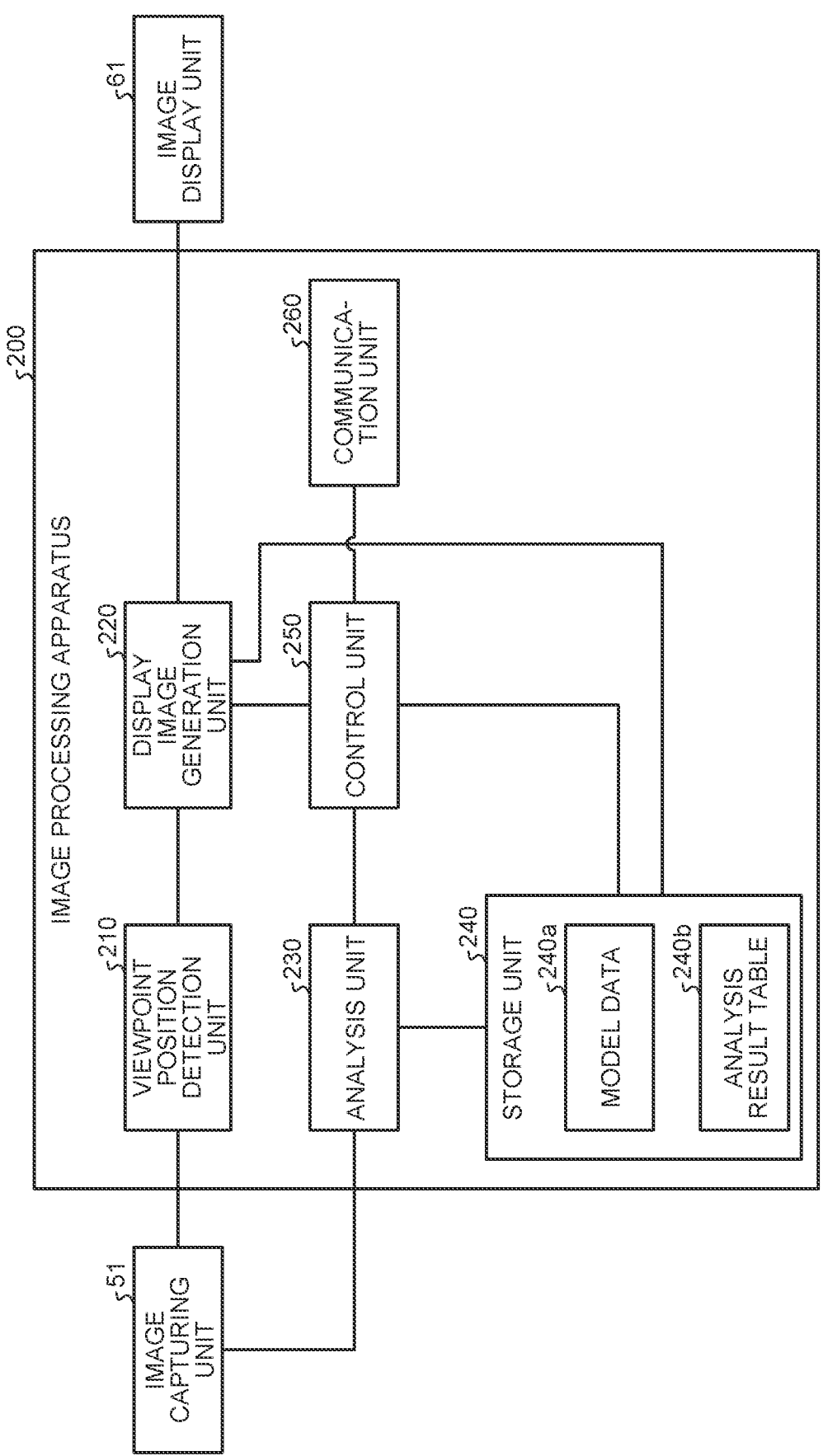
FIG. 25 is a diagram (1) illustrating a configuration example of an image processing apparatus according to the second embodiment.

2.2. Configuration of Image Processing Apparatus According to Second Embodiment FIG. 25 is a diagram (1) illustrating a configuration example of the image processing apparatus according to the second embodiment. As illustrated in FIG. 25, the image processing apparatus 200 is connected to an image capturing unit 51 and an image display unit 61. Note that the image processing apparatus 200 may include the image capturing unit 51 and the image display unit 61.

The image capturing unit 51 is a stereo camera imaging the user 10 and the real object 11a held by the user 10 that are within the imaging range. The image capturing unit 51 corresponds to the camera 4a illustrated in FIG. 24. The image capturing unit 51 includes another image sensor such as a CMOS sensor or CCD. The image capturing unit 51 outputs information about an image captured to the image processing apparatus 200. In the following description, the information about the image captured by the image capturing unit 51 is referred to as the "imaging information".

Since the image capturing unit 51 is the stereo camera, the imaging information includes an image captured by one of the cameras and an image captured by the other camera. The image capturing unit 51 captures an image at a predetermined frame rate, and outputs the imaging information to the image processing apparatus 200 every time an image is captured. Frame numbers may be assigned to the imaging information in chronological order in ascending order.

The image display unit 61 is a display device that displays a three-dimensional image on the basis of information output from the image processing apparatus 200. The image display unit 61 corresponds to the display 3a illustrated in FIG. 24. For example, the image display unit 61 displays the three-dimensional image of the virtual object 11b.

The image processing apparatus 200 includes a viewpoint position detection unit 210, a display image generation unit 220, an analysis unit 230, a storage unit 240, a control unit 250, and a communication unit 260.

The viewpoint position detection unit 210 is a processing unit that performs face detection on the basis of the imaging information and detects the viewpoint positions of the user 10. The viewpoint position detection unit 210 outputs viewpoint position information to the display image generation unit 220. Other description of the viewpoint position detection unit 210 are similar to those of the viewpoint position detection unit 110 described in the first embodiment.

The display image generation unit 220 is a processing unit that generates information for causing the image display unit 61 to display the three-dimensional image and outputs the generated information to the image display unit 61. Other description of the display image generation unit 220 are similar to those of the display image generation unit 120 described in the first embodiment.

The analysis unit 230 is a processing unit that performs various analyses on the basis of the imaging information acquired from the image capturing unit 51 and outputs results of the analyses to the control unit 250. Other processing of the analysis unit 230 is similar to that of the analysis unit 130 described in the first embodiment.

The storage unit 240 has model data 240a and an analysis result table 240b. The storage unit 240 corresponds to a semiconductor memory device such as RAM or a flash memory, or a storage device such as HDD. The description of the model data 240a is similar to the description of the model data 140a made in the first embodiment. The description of the analysis result table 240b is similar to the description of the analysis result table 140b made in the first embodiment.

The control unit 250 is a processing unit that generates the control information on the basis of the results of the analyses by the analysis unit 230 and outputs the generated control information to the display image generation unit 220. Furthermore, the control unit 250 transmits the control information to the image processing apparatus 300 via the communication unit 260.

For example, the control unit 250 performs calculation to transform the position of the real object 11a included in the analysis result to a coordinate system of a display screen of an image display unit 62 of the image processing apparatus 300 which is described later, sets information about the calculated position in the control information, and transmits the control information to the image processing apparatus 300.

The communication unit 260 is a processing unit that transmits the control information acquired from the control unit 250 to the image processing apparatus 300 via the network 20. The communication unit 260 corresponds to a communication device such as a network interface card (NIC).

Figure 26:
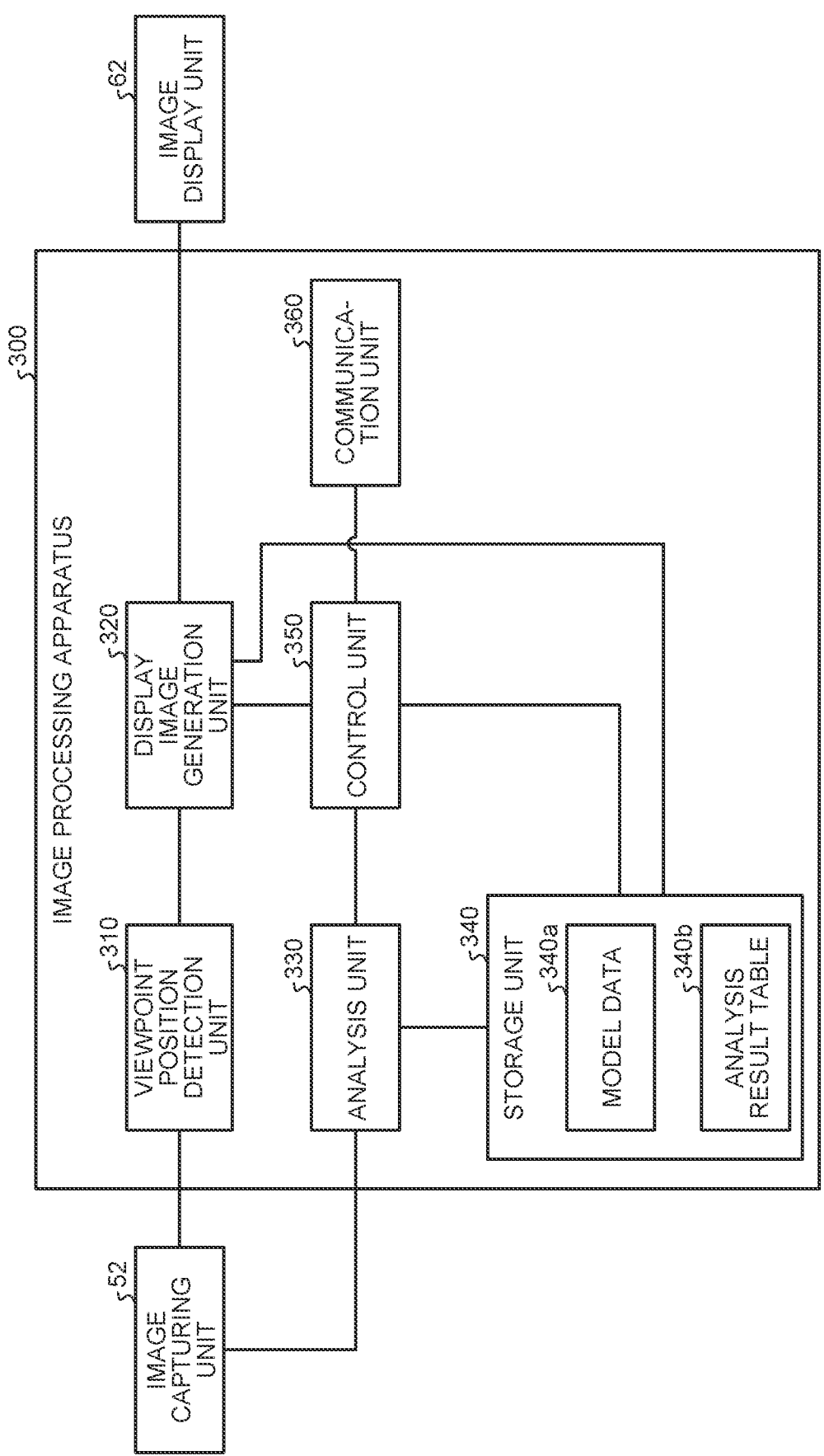
FIG. 26 is a diagram (2) illustrating a configuration example of an image processing apparatus according to the second embodiment.

FIG. 26 is a diagram (2) illustrating a configuration example of an image processing apparatus according to the second embodiment. As illustrated in FIG. 26, the image processing apparatus 300 is connected to an image capturing unit 52 and the image display unit 62. Note that the image processing apparatus 300 may include the image capturing unit 52 and the image display unit 62.

The image capturing unit 52 is a stereo camera that images a user 15 who is within the imaging range. The image capturing unit 52 corresponds to the camera 4b illustrated in FIG. 24. The image capturing unit 52 includes another image sensor such as a CMOS sensor or CCD. The image capturing unit 52 outputs information about an image captured to the image processing apparatus 200. In the following description, the information about the image captured by the image capturing unit 52 is referred to as the "imaging information".

The image display unit 62 is a display device that displays a three-dimensional image on the basis of information output from the image processing apparatus 300. The image display unit 62 corresponds to the display 3b illustrated in FIG. 24. For example, the image display unit 62 displays the three-dimensional image of the virtual object 11b.

The image processing apparatus 300 includes a viewpoint position detection unit 310, a display image generation unit 320, an analysis unit 330, a storage unit 340, a control unit 350, and a communication unit 360. Here, in the image processing apparatus 300, a "first operation mode" or a "second operation mode" is set in advance. The first operation mode is a mode in which the image processing apparatus 300 receives the control information from the image processing apparatus 200 via the network 20 and displays the three-dimensional image of the virtual object 11b on the basis of the received control information.

The second operation mode is a mode in which the image processing apparatus 300 analyzes the imaging information captured by itself by using the camera 4b and displays the three-dimensional image of the virtual object 11b. Processing performed by the viewpoint position detection unit 310, the display image generation unit 320, the analysis unit 330, and the control unit 350 of the image processing apparatus 300 in the second operation mode is similar to the processing performed by the viewpoint position detection unit 110, the display image generation unit 120, the analysis unit 130, and the control unit 150 of the image processing apparatus 100 which has been described in the first embodiment, and the description thereof will be omitted.

Hereinafter, processing performed by the viewpoint position detection unit 310, the display image generation unit 320, the analysis unit 330, the control unit 350, and the communication unit 360 of the image processing apparatus 300 in the first operation mode will be described.

The viewpoint position detection unit 310 is a processing unit that performs face detection on the basis of the imaging information and detects the viewpoint positions of the user 15. The viewpoint position detection unit 210 outputs viewpoint position information to the display image generation unit 320. Other description of the viewpoint position detection unit 310 are similar to those of the viewpoint position detection unit 110 described in the first embodiment.

The display image generation unit 320 is a processing unit that generates information for causing the image display unit 62 to display the three-dimensional image and outputs the generated information to the image display unit 62. Other description of the display image generation unit 320 are similar to those of the display image generation unit 120 described in the first embodiment.

In the first operation mode, the analysis unit 330 may pause the processing, or may perform processing similar to that of the analysis unit 130 described in the first embodiment.

The storage unit 340 has model data 340a and an analysis result table 340b. The storage unit 340 corresponds to a semiconductor memory device such as RAM or a flash memory, or a storage device such as HDD. The description of the model data 340a is similar to the description of the model data 140a made in the first embodiment. The description of the analysis result table 340b is similar to the description of the analysis result table 140b made in the first embodiment.

The control unit 250 is a processing unit that acquires the control information from the image processing apparatus 200 via the communication unit 360 and outputs the acquired control information to the display image generation unit 320.

The communication unit 360 is a processing unit that receives the control information from the image processing apparatus 200 via the network 20. The communication unit 360 corresponds to a communication device such as NIC.

(Process Procedure Performed by Image Processing Apparatus 200)

Figure 27:
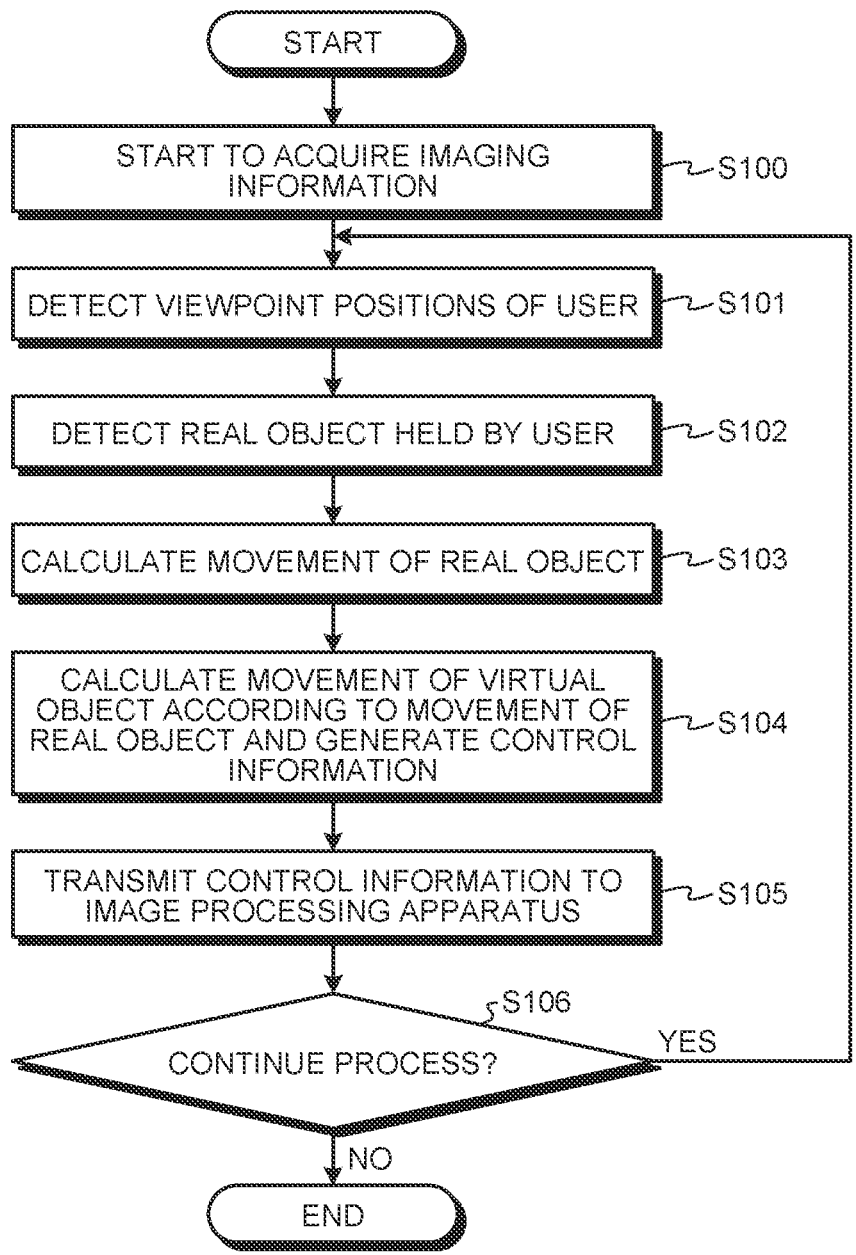
FIG. 27 is a flowchart (1) illustrating a process procedure performed by the image processing apparatus according to the second embodiment.

FIG. 27 is a flowchart (1) illustrating a process procedure performed by the image processing apparatus according to the second embodiment. As illustrated in FIG. 27, the image processing apparatus 200 starts acquisition of the imaging information from the image capturing unit 51 (Step S100). The viewpoint position detection unit 210 of the image processing apparatus 200 detects each viewpoint position of the user 10 (Step S101).

The analysis unit 230 of the image processing apparatus 200 detects the real object 11a held by the user 10 (Step S102). The control unit 250 of the image processing apparatus 200 calculates the movement of the real object 11a (Step S103). The control unit 250 of the image processing apparatus 200 calculates the movement of the virtual object 11*b* according to the movement of the real object 11*a* to generate the control information (Step S104).

The communication unit 260 of the image processing apparatus 200 transmits the control information to the image processing apparatus 300 (Step S105). When the process is continued (Step S106, Yes), the image processing apparatus 200 proceeds to Step S101. On the other hand, when the process is not continued (Step S106, No), the image processing apparatus 200 finishes the process.

(Process Procedure Performed by Image Processing Apparatus 300)

Figure 28:
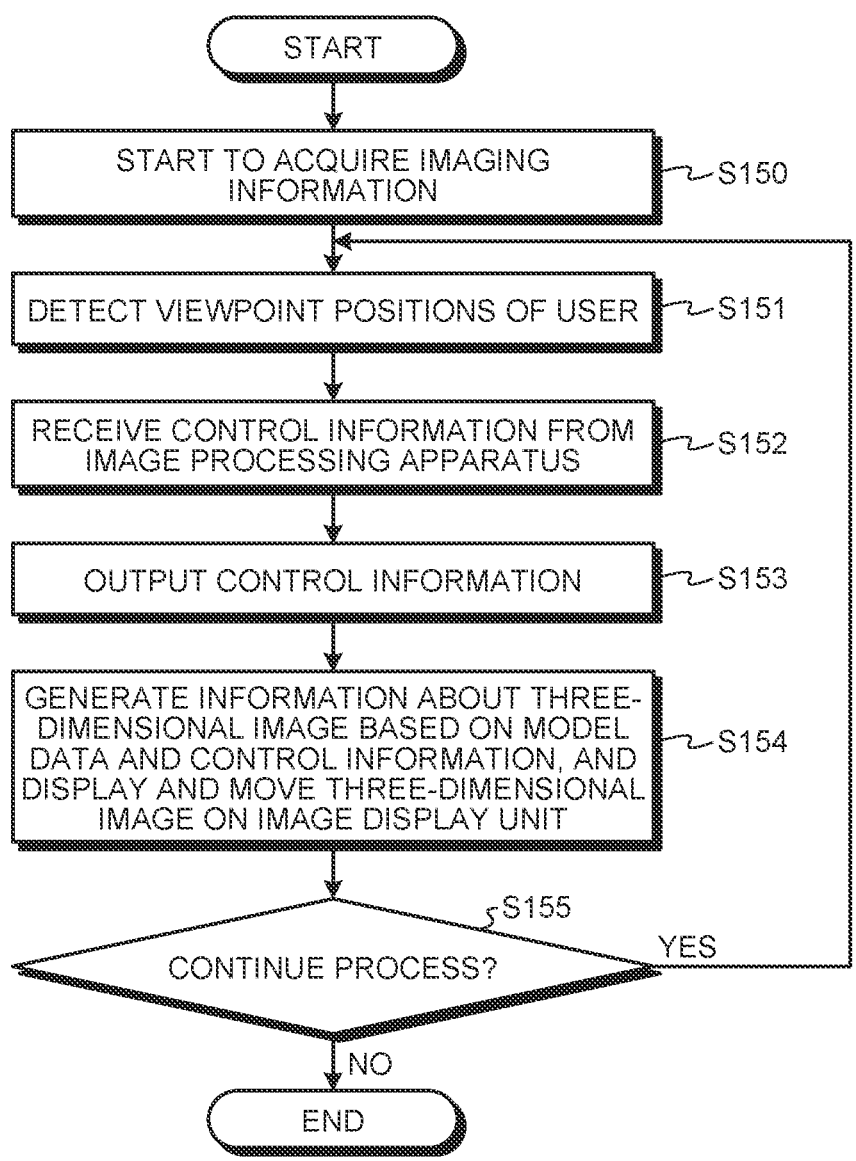
FIG. 28 is a flowchart (2) illustrating a process procedure performed by the image processing apparatus according to the second embodiment.

FIG. 28 is a flowchart (2) illustrating a process procedure performed by the image processing apparatus according to the second embodiment. As illustrated in FIG. 28, the image processing apparatus 300 starts acquisition of the imaging information from the image capturing unit 52 (Step S150). The viewpoint position detection unit 310 of the image processing apparatus 300 detects each viewpoint position of the user 15 (Step S151).

The communication unit 360 of the image processing apparatus 300 receives the control information from the image processing apparatus 200 (Step S152). The control unit 350 of the image processing apparatus 300 outputs the control information to the display image generation unit 320 (Step S153).

The display image generation unit 320 of the image processing apparatus 300 generates the information about the three-dimensional image on the basis of the model data 340*a* and the control information, and causes the image display unit 60 to display and move the three-dimensional image (Step S154).

When the process is continued (Step S155, Yes), the image processing apparatus 300 proceeds to Step S151. On the other hand, when the process is not continued (Step S155, No), the image processing apparatus 300 finishes the process.

2.3. Effects of Image Processing Apparatus According to Second Embodiment

As described above, in the image processing apparatus 200, the analysis unit 230 analyzes the imaging information, and the control unit 250 generates the control information on the basis of the results of the analyses and transmits the control information to the image processing apparatus 300. When receiving the control information, the image processing apparatus 300 displays the three-dimensional image of the virtual object 11*b* on the display 3*b*, on the basis of the model data 340*a* and the control information. This configuration makes it possible to reproduce the movement of the real object 11*a* held by the user 10 positioned at a place different from a place where the user 15 is positioned, with the three-dimensional image displayed by the image processing apparatus 300.

3. Third Embodiment

3.1. Example of Appearance of Image Processing Apparatus

Figure 29:
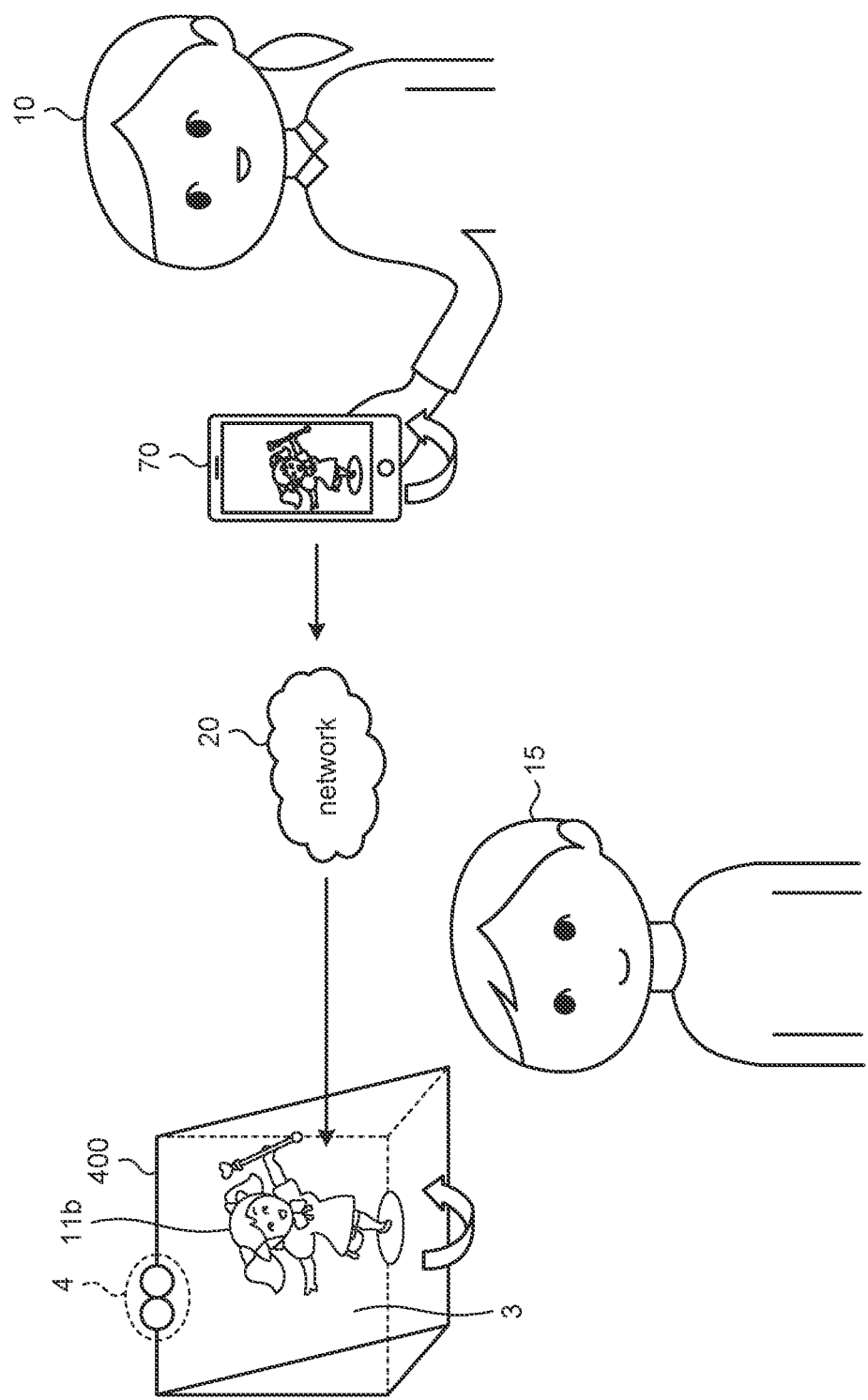
FIG. 29 is a diagram illustrating an example of a situation according to a third embodiment.

FIG. 29 is a diagram illustrating an example of a situation according to a third embodiment. As illustrated in FIG. 29, an image processing apparatus 400 and a terminal device 70 are connected to each other via the network 20. The terminal device 70 corresponds to a tablet terminal, a smartphone, or the like.

The user 10 holds the terminal device 70. When the user 10 moves the terminal device 70, the terminal device 70 calculates motion information about the terminal device 70 by using an acceleration sensor or the like, and transmits the control information in which the motion information is set, to the image processing apparatus 400. When receiving the control information, the image processing apparatus 400 displays the three-dimensional image of the virtual object 11*b* on the display 3, on the basis of the model data about the virtual object 11*b* and the control information.

Figure 30:
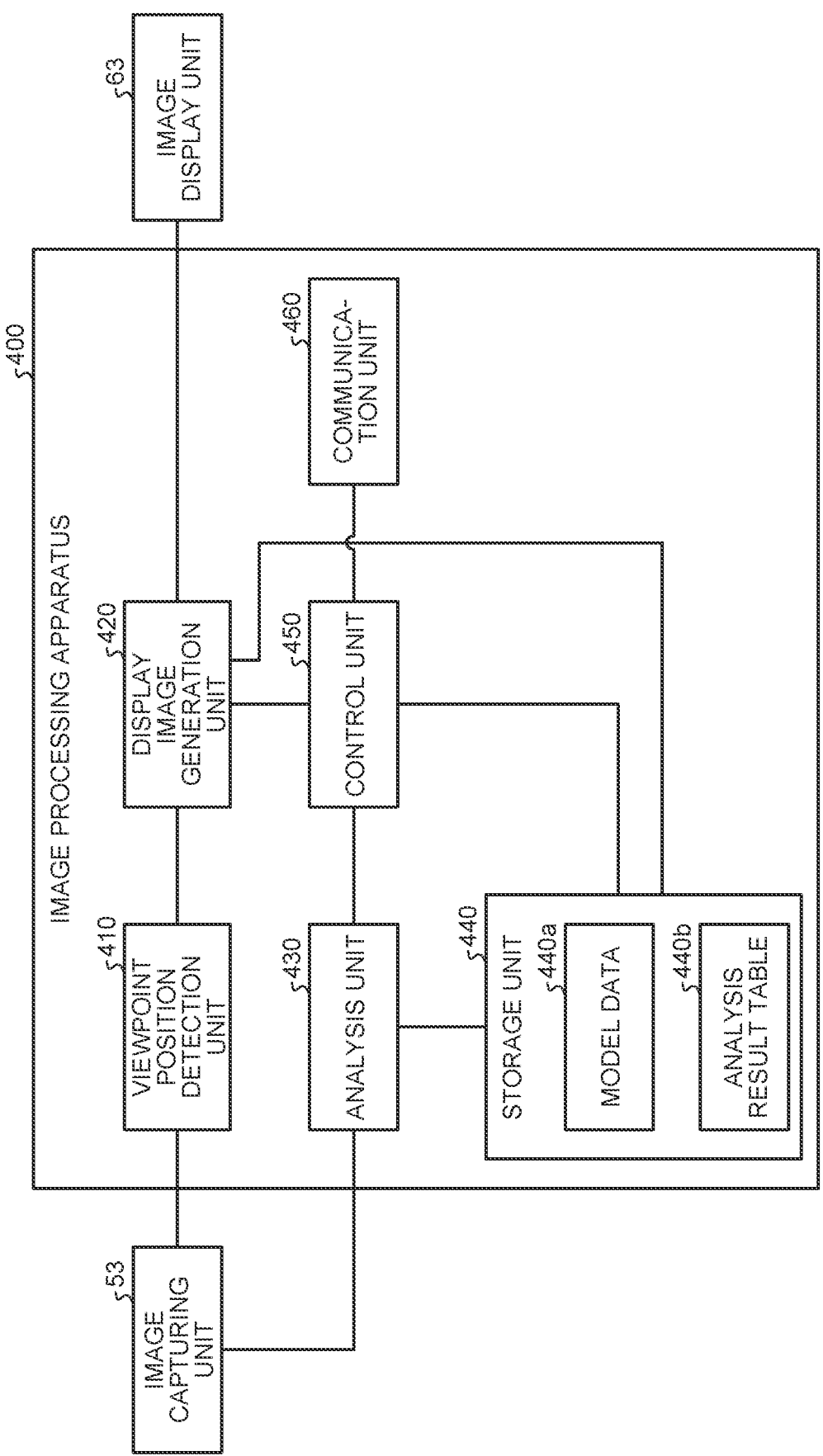
FIG. 30 is a diagram illustrating a configuration example of an image processing apparatus according to the third embodiment.

3.2. Configuration of Image Processing Apparatus According to Third Embodiment FIG. 30 is a diagram illustrating a configuration example of the image processing apparatus according to the third embodiment. As illustrated in FIG. 30, the image processing apparatus 400 is connected to an image capturing unit 53 and an image display unit 63. Note that the image processing apparatus 400 may include the image capturing unit 53 and the image display unit 63.

The image capturing unit 53 is a stereo camera that images the user 15 who is within an imaging range. The image capturing unit 51 corresponds to the camera 4 illustrated in FIG. 29. The image capturing unit 53 includes another image sensor such as a CMOS sensor or CCD. The image capturing unit 53 outputs information about an image captured to the image processing apparatus 400. In the following description, the information about the image captured by the image capturing unit 53 is referred to as the "imaging information".

Since the image capturing unit 53 is the stereo camera, the imaging information includes an image captured by one of the cameras and an image captured by the other camera. The image capturing unit 53 captures an image at a predetermined frame rate, and outputs the imaging information to the image processing apparatus 400 every time an image is captured. Frame numbers may be assigned to the imaging information in chronological order in ascending order.

The image display unit 63 is a display device that displays a three-dimensional image on the basis of information output from the image processing apparatus 400. The image display unit 63 corresponds to the display 3 illustrated in FIG. 29. For example, the image display unit 63 displays the three-dimensional image of the virtual object 11*b*.

The image processing apparatus 400 includes a viewpoint position detection unit 410, a display image generation unit 420, an analysis unit 430, a storage unit 440, a control unit 450, and a communication unit 460.

The viewpoint position detection unit 410 is a processing unit that performs face detection on the basis of the imaging information and detects the viewpoint positions of the user 15. The viewpoint position detection unit 410 outputs viewpoint position information to the display image generation unit 420. Other description of the viewpoint position detection unit 410 are similar to those of the viewpoint position detection unit 110 described in the first embodiment.

The display image generation unit 420 is a processing unit that generates information for causing the image display unit 63 to display the three-dimensional image and outputs the generated information to the image display unit 63. Other description of the display image generation unit 420 are similar to those of the display image generation unit 120 described in the first embodiment.

The analysis unit 430 is a processing unit that performs various analyses on the basis of the imaging information acquired from the image capturing unit 53 and outputs results of the analyses to the control unit 450. Other processing of the analysis unit 430 is similar to that of the analysis unit 130 described in the first embodiment. Note that, in a case where the real object 11*a* is not included in the imaging information, the analysis unit 430 does not perform the processing of detecting the real object 11*a*.

The storage unit 440 has model data 440*a* and an analysis result table 440*b*. The storage unit 440 corresponds to a semiconductor memory device such as RAM or a flash memory, or a storage device such as HDD. The description of the model data 440*a* is similar to the description of the model data 140*a* made in the first embodiment. The description of the analysis result table 440*b* is similar to the description of the analysis result table 140*b* made in the first embodiment.

The control unit 450 is a processing unit that acquires the control information from the terminal device 70 and outputs the acquired control information to the display image generation unit 420. Note that the control unit 450 may transform a change in the movement included in the control information acquired from the terminal device 70 to the coordinate system of the image display unit 60 to output, to the display image generation unit 420, the control information updated so as to match the movement of the virtual object 11*b*.

The communication unit 460 is a processing unit that receives the control information from the terminal device 70 via the network 20. The communication unit 460 corresponds to a communication device such as NIC.

(Process Procedure Performed by Terminal Device 70)

Figure 31:
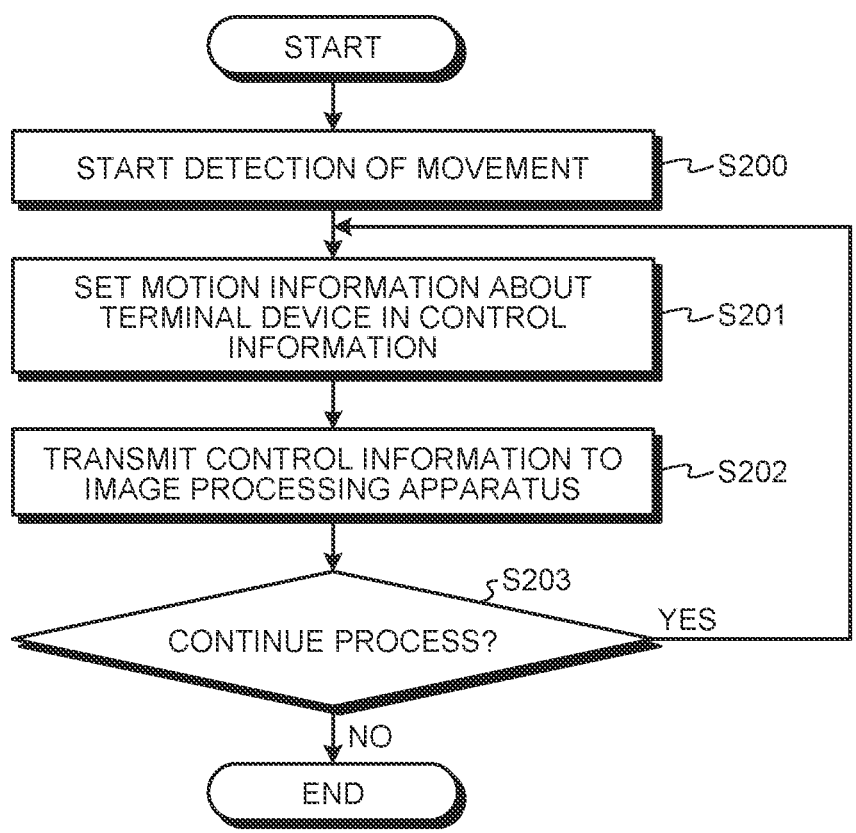
FIG. 31 is a flowchart illustrating a process procedure performed by a terminal device according to the third embodiment.

FIG. 31 is a flowchart illustrating a process procedure performed by the terminal device according to the third embodiment. As illustrated in FIG. 31, the terminal device 70 starts detection of the movement by using the acceleration sensor or the like set in the terminal device itself (Step S200). The terminal device 70 sets the motion information about the terminal device 70 in the control information (Step S201).

The terminal device 70 transmits the control information to the image processing apparatus 400 (Step S202). When the process is continued (Step S203, Yes), the terminal device 70 proceeds to Step S201. When the process is not continued (Step S203, No), the terminal device 70 finishes the process.

(Process Procedure Performed by Image Processing Apparatus 400)

Figure 32:
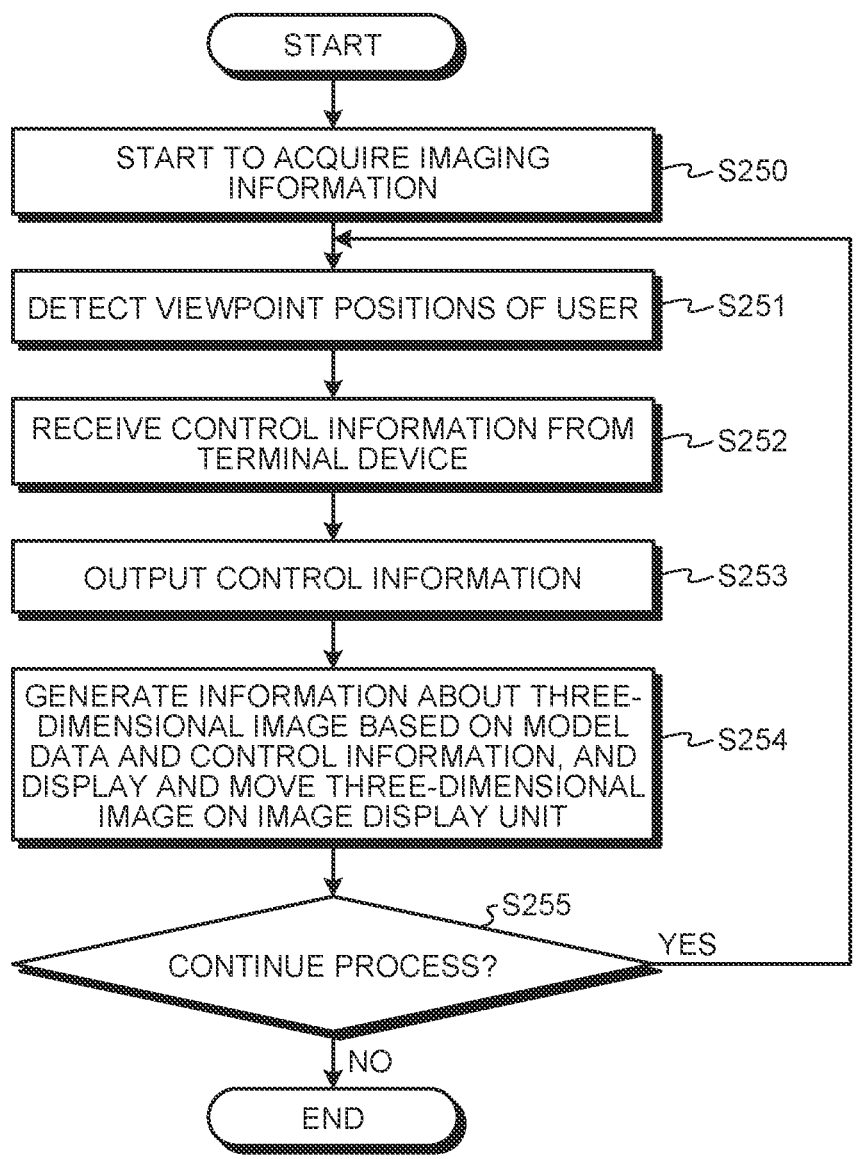
FIG. 32 is a flowchart illustrating a process procedure performed by the image processing apparatus according to the third embodiment.

FIG. 32 is a flowchart illustrating a process procedure performed by the image processing apparatus according to the third embodiment. As illustrated in FIG. 32, the image processing apparatus 400 starts acquisition of the imaging information from the image capturing unit 53 (Step S250). The viewpoint position detection unit 410 of the image processing apparatus 400 detects each viewpoint position of the user 15 (Step S251).

The communication unit 460 of the image processing apparatus 400 receives the control information from the terminal device 70 (Step S252). The control unit 450 of the image processing apparatus 400 outputs the control information to the display image generation unit 420 (Step S253).

The display image generation unit 420 of the image processing apparatus 400 generates the information about the three-dimensional image on the basis of the model data 440*a* and the control information, and causes the image display unit 63 to display and move the three-dimensional image (Step S254).

When the process is continued (Step S255, Yes), the image processing apparatus 400 proceeds to Step S251. On the other hand, when the process is not continued (Step S255, No), the image processing apparatus 400 finishes the process.

3.3. Effects of Image Processing Apparatus According to Third Embodiment

As described above, the image processing apparatus 400 receives the control information indicating the movement of the terminal device 70, from the terminal device 70, and displays the three-dimensional image of the virtual object 11*b* on the display 3*b* on the basis of the model data 440*a* and the control information. This configuration makes it possible to reproduce the movement of the terminal device 70 held by the user 10 positioned at a place different from a place where the user 15 is positioned, with the three-dimensional image displayed by the image processing apparatus 400.

4. Other Embodiments (Shielded and Non-Shielded Areas when there is Plurality of Users)

In the example of FIG. 5, calculation of the shielded area 60*a* and the non-shielded area 60*b* that are applied to one user, by the analysis unit 130 has been described, but even if there is a plurality of users (e.g., two users), the shielded area 60*a* and the non-shielded area 60*b* can be calculated. Processing units according to other embodiments will be described using reference numerals and symbols used in FIG. 4.

Figure 33:
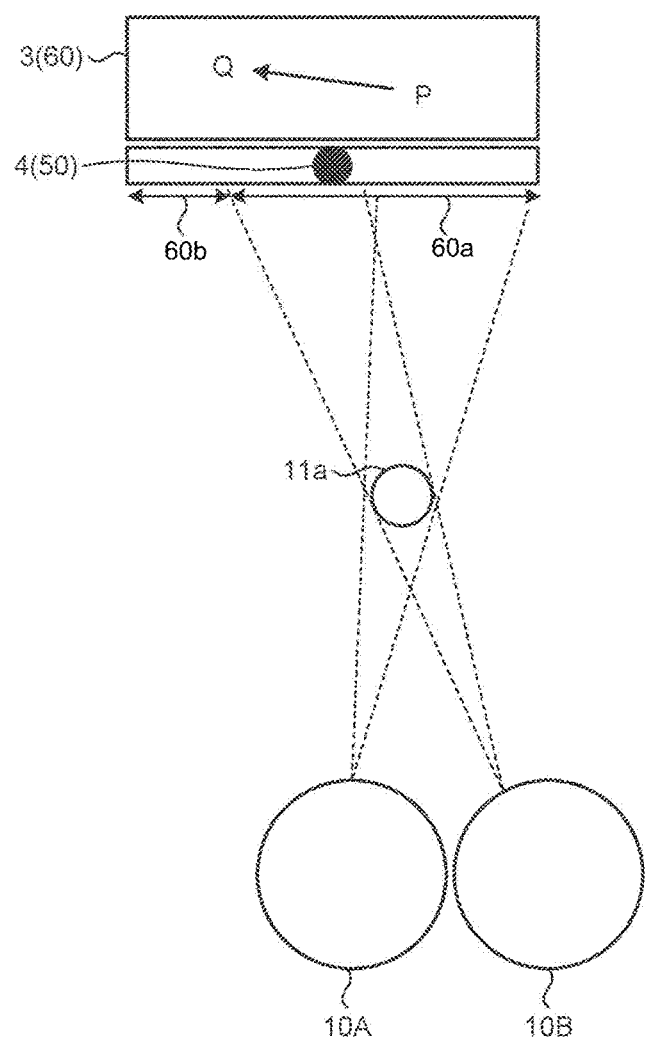
FIG. 33 is a diagram illustrating an example of a shielded area and a non-shielded area when there is a plurality of users.

FIG. 33 is a diagram illustrating an example of a shielded area and a non-shielded area when there is a plurality of users. The analysis unit 130 performs stereo matching for each portion of two images included in the imaging information, and calculates distances from users 10A and 10B to the display 3 and a distance from the real object 11*a* to the display 3, which are included in the imaging information. In the following description, the distance between the user 10A and the display 3 is referred to as a "third distance". The distance between the user 10B and the display 3 is referred to as a "fourth distance." The distance between the real object 11*a* and the display 3 is referred to as a "second distance".

The analysis unit 130 calculates the shielded area 60*a* and the non-shielded area 60*b* from a geometric relationship between the size of the real object 11*a*, the viewpoint positions of the users 10A and 10B, the second distance, the third distance, and the fourth distance. The shielded area 60*a* indicates an area that the user 10A or the user 10B cannot view due to the real object 11*a*, of a display area of the display 3. The non-shielded area 60*b* indicates an area that the user 10A and the user 10B can view, of the display area of the display 3.

The control unit 150 performs, for example, the processing described in the control policy P4, on the basis of the results of analyses by the analysis unit 130. In other words, the control unit 150 performs control to cause the three-dimensional image to be displayed in the non-shielded area of the image display unit 60.

(Process Procedure Performed by Image Processing Apparatus According to Other Embodiments)

Figure 34:
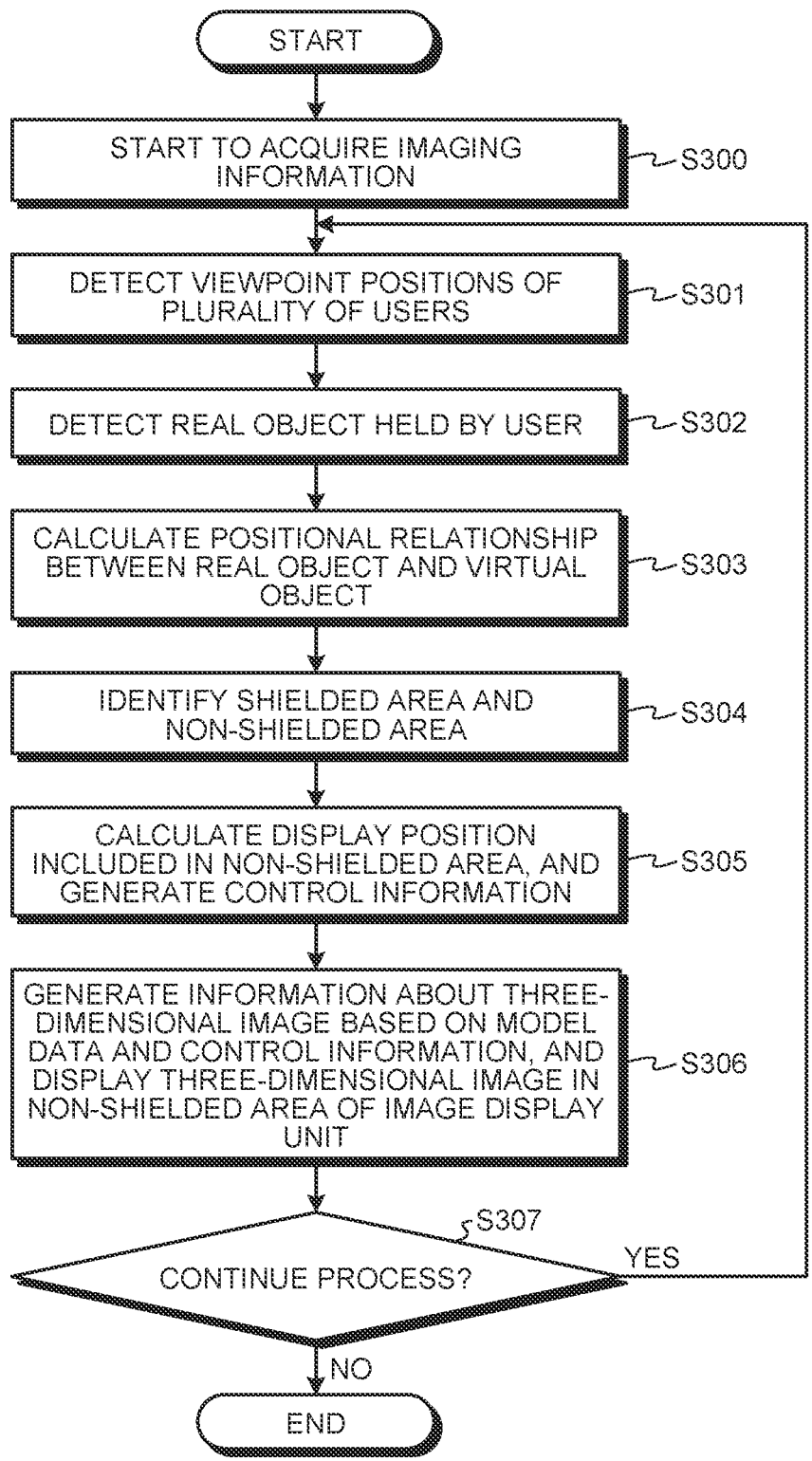
FIG. 34 is a flowchart illustrating a process procedure performed by an image processing apparatus according to other embodiments.

FIG. 34 is a flowchart illustrating a process procedure performed by an image processing apparatus according to other embodiments. As illustrated in FIG. 34, the image processing apparatus 100 starts acquisition of the imaging information from the image capturing unit 50 (Step S300).

The viewpoint position detection unit 110 of the image processing apparatus 100 detects each viewpoint position of a plurality of users 10A and 10B (Step S301).

The analysis unit 130 of the image processing apparatus 100 detects the real object 11a held by the user 10A (or the user 10B) (Step S302). The analysis unit 130 calculates the positional relationship between the real object 11a and the virtual object 11b (Step S303). The control unit 150 of the image processing apparatus 100 identifies the shielded area and the non-shielded area (Step S304).

The control unit 150 calculates the display position included in the non-shielded area and generates the control information (Step S305). The display image generation unit 120 generates the information about the three-dimensional image on the basis of the model data 140a and the control information, and causes the image display unit 60 to display the three-dimensional image in the non-shielded area (Step S306).

When the process is continued (Step S307, Yes), the image processing apparatus 100 proceeds to Step S301. On the other hand, when the process is not continued (Step S307, No), the image processing apparatus 100 finishes the process.

The image processing apparatus 100 performs the above process to display the three-dimensional image (virtual object 11b) in the non-shielded area on the basis of the viewpoint positions of the plurality of users, enabling the plurality of users to simultaneously refer to both the real object 11a and the three-dimensional image.

5. Hardware Configuration

Figure 35:
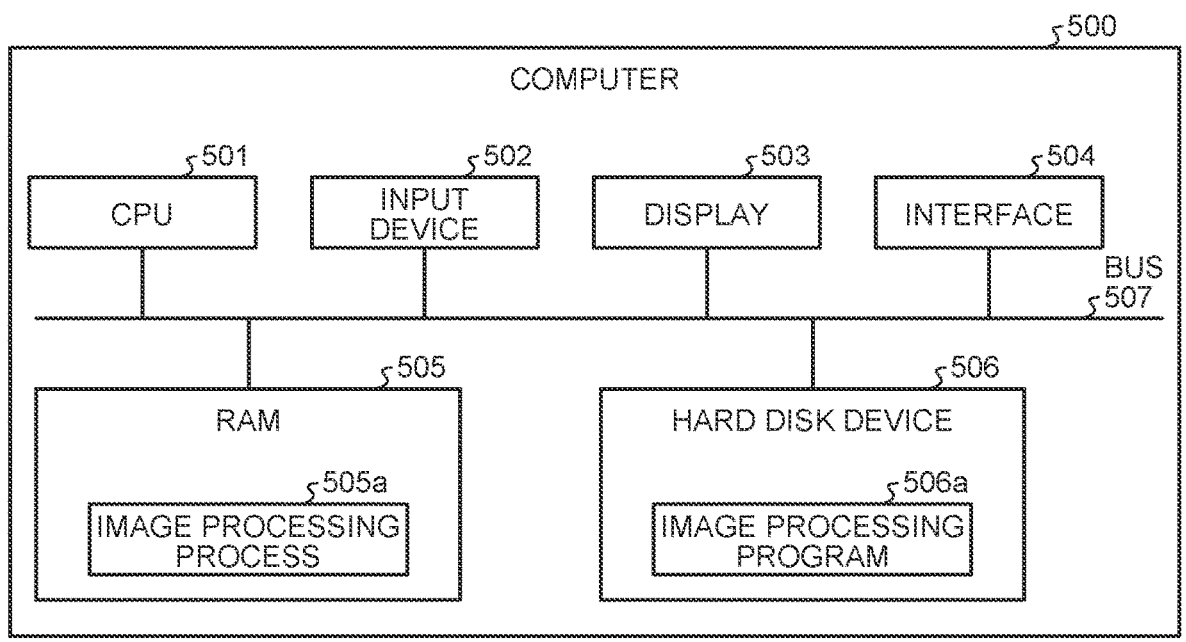
FIG. 35 is a hardware configuration diagram illustrating an example of a computer implementing the functions of the image processing apparatus.

The image processing apparatuses according to the embodiments as described above are implemented by a computer 500 having a configuration as illustrated in FIG. 35. Hereinafter, an example of the image processing apparatus 100 (200, 300, or 400) according to an embodiment will be described. FIG. 35 is a hardware configuration diagram illustrating an example of the computer 500 implementing the functions of the image processing apparatus. The computer 500 includes CPU 501 that executes various arithmetic processing, an input device 502 that receives an input of data from a user, and a display 503 that displays a three-dimensional image. In addition, the computer 500 includes an interface 504 for connection to various devices. The interface 504 is connected to a camera or the like.

A hard disk device 506 includes an image processing program 506a. The CPU 501 reads the image processing program 506a and deploys the image processing program to RAM 505. The image processing program 506a functions as an image processing process 505a.

The processing of the image processing process 505a corresponds to processing of each of the viewpoint position detection unit 110, the display image generation unit 120, the analysis unit 130, and the control unit 150 which are illustrated in FIG. 4.

Note that the image processing program 506a is not necessarily stored in the hard disk device 206 from the beginning. For example, each program is stored in a "portable physical medium" such as a flexible disk (FD), CD-ROM, DVD disk, magneto-optical disk, or IC card that is inserted into the computer 500. Then, the computer 500 may read and execute the image processing program 506a.

6. Conclusion

The image processing apparatus includes the imaging unit, the analysis unit, and the control unit. The imaging unit images the user and the real object. The analysis unit analyzes the attitude of the real object on the basis of the imaging information captured by the imaging unit. The control unit controls display of the image related to the real object on the basis of the attitude of the real object. This configuration makes it possible for the user 10 to refers to the three-dimensional image of the virtual object 11b having the same attitude as the attitude of the real object 11a held by the user, thus, supporting the work of the user 10.

The analysis unit further performs processing of calculating the size of the real object on the basis of the imaging information, and the control unit controls the size of the image related to the real object on the basis of the size of the real object. This configuration makes it possible for the user 10 to refers to the three-dimensional image of the virtual object 11b having the same size as that of the real object 11a held by the user, thus, supporting the work of the user 10.

The analysis unit calculates the first distance between the display screen on which the image is displayed and the user and the second distance between the display screen and the real object, on the basis of the imaging information, and the control unit adjusts the size of the image related to the real object, on the basis of the first distance and the second distance. Even if the real object 11a is positioned closer to the user 10 than to the image display unit 60, this configuration makes it possible for the user 10 to refer to the three-dimensional image of the virtual object 11b having an apparent size the same as the size of the real object 11a held by the user, thus, supporting the work of the user 10.

The real object is positioned between the display screen on which the image is displayed and the user, the analysis unit calculates the shielded area that the user cannot refer to due to the real object and the non-shielded area that the user can refer to, of the area of the display screen, on the basis of the imaging information, and the control unit causes the image related to the real object to be displayed in the non-shielded area.

The real object is positioned between the display screen and a plurality of users, the analysis unit calculates the shielded area that the plurality of users cannot refer to due to the real object and the non-shielded area that the plurality of users can refer to, of the area of the display screen, on the basis of the imaging information, and the control unit causes the image related to the real object to be displayed in the non-shielded area. This configuration makes is possible for the plurality of users to simultaneously refer to both the real object 11a and the three-dimensional image.

The control unit causes the image related to the real object to be displayed in the non-shielded area or the shielded area, on the basis of the distance between the real object and the image related to the real object displayed on the display screen. This configuration makes it possible to support the work of the user 10, both for the "viewing the real object 11a and the three-dimensional image in an overlapping manner" and the "viewing the real object 11a and the three-dimensional image in an aligned manner".

The analysis unit calculates the movement of the position of the user and the movement of the real object, on the basis of the imaging information, and the control unit controls the position of the display screen on which the image related to the real object is displayed, on the basis of the movement of the position of the user and the movement of the real object. This configuration makes it possible to show the change corresponding to the movement of the real object 11a by moving the display position of the virtual object 11b instead, supporting the work of the user 10.

The control unit receives, from another device, display control information that is created on the basis of imaging information captured by another imaging unit imaging another real object and that controls the display of the image related to the real object, and controls the display of the image related to the real object on the basis of the received display control information. This configuration makes it possible to reproduce the movement of the real object 11a held by the user 10 positioned at a place different from a place where the user 15 is positioned, with the three-dimensional image displayed by the image processing apparatus 300.

The control unit receives, from the terminal device, the display control information that is created on the basis of the movement of the terminal device and that controls the display of the image related to the real object, and controls the display of the image related to the real object on the basis of the received display control information. This configuration makes it possible to reproduce the movement of the terminal device 70 held by the user 10 positioned at a place different from a place where the user 15 is positioned, with the three-dimensional image displayed by the image processing apparatus 400.

The analysis unit analyzes the attitude and movement of the real object, on the basis of the imaging information, and stores the features of the real object and information about the attitude and movement of the real object in the storage unit. The control unit acquires the information about the attitude and movement corresponding to the features of the real object, analyzed by the analysis unit, from the storage unit, and controls the display of the image related to the real object, on the basis of the acquired information about the attitude and movement. This configuration makes it possible to reproduce the movement of the real object 11a in the past with the virtual object 11b.

The analysis unit estimates the illumination position and the illumination color for the real object, on the basis of the imaging information, and the control unit causes the color of the image related to the real object to be changed on the basis of the illumination position and the illumination color. This configuration makes it possible to reflect the effects of the illumination similar to those in illuminating the real object 11a, in the virtual object 11b.

It should be noted that the effects described herein are merely examples, and the present invention is not limited to these effects and may have other effects.

Note that the present technology can also employ the following configurations.

(1)

An image processing apparatus including:
an imaging unit that images a user and a real object;
an analysis unit that analyzes an attitude of the real object based on imaging information captured by the imaging unit; and
a control unit that controls display of an image related to the real object based on the attitude of the real object.

(2)

The image processing apparatus according to (1), wherein the analysis unit further performs processing of calculating a size of the real object based on the imaging information, and the control unit controls a size of the image related to the real object based on the size of the real object.

(3)

The image processing apparatus according to (1) or (2), wherein the analysis unit calculates a first distance between a display screen on which the image is displayed and the user and a second distance between the display screen and the real object, based on the imaging information, and the control unit adjusts the size of the image related to the real object, based on the first distance and the second distance.

(4)

The image processing apparatus according to (1), (2), or (3), wherein the real object is positioned between the display screen on which the image is displayed and the user, the analysis unit calculates a shielded area that the user cannot refer to due to the real object and a non-shielded area that the user can refer to, of an area of the display screen, based on the imaging information, and the control unit causes the image related to the real object to be displayed in the non-shielded area.

(5)

The image processing apparatus according to any one of (1) to (4), wherein the real object is positioned between the display screen and a plurality of users, the analysis unit calculates a shielded area that the plurality of users cannot refer to due to the real object and a non-shielded area that the plurality of users can refer to, of the area of the display screen, based on the imaging information, and the control unit causes the image related to the real object to be displayed in the non-shielded area.

(6)

The image processing apparatus according to (4), wherein the control unit causes the image related to the real object to be displayed in the non-shielded area or the shielded area, based on a distance between the real object and the image related to the real object displayed on the display screen.

(7)

The image processing apparatus according to any one of (1) to (6), wherein the analysis unit calculates movement of a position of the user and movement of the real object, based on the imaging information, and the control unit controls a position of the display screen on which the image related to the real object is displayed, based on the movement of the position of the user and the movement of the real object.

(8)

The image processing apparatus according to (1), wherein the control unit receives, from another device, display control information that is created based on imaging information captured by another imaging unit imaging another real object and that controls the display of the image related to the real object, and controls the display of the image related to the real object based on the received display control information.

(9)

The image processing apparatus according to (1), wherein the control unit receives, from the terminal device, display control information that is created based on movement of a terminal device and that controls the display of the image related to the real object, and controls the display of the image related to the real object based on the received display control information.

(10)

The image processing apparatus according to (1), wherein the analysis unit further performs processing of analyzing an attitude and movement of the real object, based on the imaging information, and storing features of the real object and information about the attitude and movement of the real object, in a storage unit.

(11)

The image processing apparatus according to (1), wherein the control unit acquires information about an attitude and movement corresponding to features of the real object, analyzed by the analysis unit, from a storage unit, and controls the display of the image related to the real object, based on the acquired information about the attitude and movement.

(12)

The image processing apparatus according to any one of (1) to (7), wherein the analysis unit estimates an illumination position and an illumination color for the real object, based on the imaging information, and the control unit causes the color of the image related to the real object to be changed based on the illumination position and the illumination color.

(13)

The image processing apparatus according to any one of (1) to (12), wherein the control unit controls display of a three-dimensional image related to the real object.

(14)

An image processing method including performing the following processes by a computer:

analyzing an attitude of a real object based on imaging information captured by an imaging unit imaging a user and the real object; and controlling display of an image related to the real object based on the attitude of the real object.

(15)

An Image Processing Program causing a computer to function as:

an analysis unit that analyzes an attitude of a real object based on imaging information captured by an imaging unit imaging a user and a real object; and a control unit that controls display of an image related to the real object based on the attitude of the real object.

REFERENCE SIGNS LIST 50, 51, 52, 53 IMAGE CAPTURING UNIT
60, 61, 62, 63 IMAGE DISPLAY UNIT
100, 200, 300, 400 IMAGE PROCESSING APPARATUS
110, 210, 310, 410 VIEWPOINT POSITION DETECTION UNIT
120, 220, 320, 420 DISPLAY IMAGE GENERATION UNIT
130, 230, 330, 430 ANALYSIS UNIT
140, 240, 340, 440 STORAGE UNIT
140a, 240a, 340a, 440a MODEL DATA
140b, 240b, 340b, 440b ANALYSIS RESULT TABLE
150, 250, 350, 450 CONTROL UNIT
260, 360, 460 COMMUNICATION UNIT

The invention claimed is:

1. A three-dimensional image processing apparatus, comprising:
at least one processor configured to:
acquire, from a camera fixed to a display, a captured image including at least one user and a real object, wherein the real object is between the at least one user and the display in a real space;
determine a three-dimensional geometric relationship of the real object and a viewpoint of the at least one user based on the captured image;
determine, based on the three-dimensional geometric relationship, whether an entire area of the display includes a shielded area, wherein
the shielded area corresponds to a partial area of the display, and
the real object shields the partial area from the at least one user; and
control, based on determination that the entire area of the display includes the shielded area, the display to move a virtual object related to the real object to a non-shielded area of the display to avoid displaying the virtual object in the shielded area, wherein the non-shielded area is an area of the display other than the shielded area.

2. The three-dimensional image processing apparatus according to claim 1, wherein
the three-dimensional geometric relationship includes size information representing a size of the real object and distance information that represents a first distance between the at least one user and the display, and a second distance between the real object and the display, and
the at least one processor is further configured to control the display to adjust a size of the virtual object based on a change of the three-dimensional geometric relationship.

3. The three-dimensional image processing apparatus according to claim 1, wherein
the at least one user includes a first user and a second user,
the shielded area includes a first shielded area corresponding to the first user and a second shielded area corresponding to the second user, and
the non-shielded area is an area of the display other than the first shielded area and the second shielded area.

4. The three-dimensional image processing apparatus according to claim 1, wherein the at least one processor is further configured to:
determine whether a first-person-view distance between an apparent position of the real object and an apparent position of the virtual object on the display viewed from the user is lower than a specific threshold; and
display, based on determination that the first-person-view distance is lower than the specific threshold, the virtual object in the shielded area such that the apparent position of the virtual object becomes substantially equal to the apparent position of the real object when viewable from the user.

5. The three-dimensional image processing apparatus according to claim 1, wherein the at least one processor is further configured to:
control the display to present a motion parallax of the virtual object based on at least one of a movement of the viewpoint of the at least one user or a movement of the real object.

6. A three-dimensional image processing system, comprising:
a display;
a camera fixed to the display;
at least one processor configured to
acquire, from the camera, a captured image including at least one user and a real object, wherein the real object is between the at least one user and the display in a real space;
determine a three-dimensional geometric relationship of the real object and a viewpoint of the at least one user based on the captured image;
determine, based on the three-dimensional geometric relationship, whether an entire area of the display includes a shielded area, wherein
the shielded area corresponds to a partial area of the display, and
the real object shields the partial area from the at least one user; and
control, based on determination that the entire area of the display includes the shielded area, the display to move a virtual object related to the real object to a non-shielded area of the display to avoid displaying the virtual object in the shielded area, wherein the non-shielded area is an area of the display other than the shielded area.

7. A three-dimensional image processing method, comprising:
acquiring, from a camera fixed to a display, a captured image including at least one user and a real object, wherein the real object is between the at least one user and the display in a real space;
determining a three-dimensional geometric relationship of the real object and a viewpoint of the at least one user based on the captured image;
determining, based on the three-dimensional geometric relationship, whether an entire area of the display includes a shielded area, wherein
the shielded area corresponds to a partial area of the display, and
the real object shields the partial area from the at least one user; and
controlling, based on determination that the entire area of the display includes the shielded area, the display to move a virtual object related to the real object to a non-shielded area of the display to avoid displaying the virtual object in the shielded area, wherein the non-shielded area is an area of the display other than the shielded area.

* * * * *